US012406648B2

(12) United States Patent
Oleske et al.

(10) Patent No.: US 12,406,648 B2
(45) Date of Patent: Sep. 2, 2025

(54) ACOUSTIC BUILDING PANELS

(71) Applicant: ARMSTRONG WORLD INDUSTRIES, INC., Lancaster, PA (US)

(72) Inventors: Peter J. Oleske, Lancaster, PA (US); John Felegi, Jr., Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 374 days.

(21) Appl. No.: 17/709,827

(22) Filed: Mar. 31, 2022

(65) Prior Publication Data

US 2022/0319486 A1 Oct. 6, 2022

Related U.S. Application Data

(60) Provisional application No. 63/169,694, filed on Apr. 1, 2021.

(51) Int. Cl.

*G10K 11/162* (2006.01)
*E04B 9/04* (2006.01)
*E04B 9/24* (2006.01)

(52) U.S. Cl.

CPC .............. *G10K 11/162* (2013.01); *E04B 9/04* (2013.01); *E04B 9/241* (2013.01)

(58) Field of Classification Search

CPC . E04B 9/04; E04B 9/241; E04B 9/001; E04B 9/045; E04B 1/84; E04B 1/86; E04B 1/88
USPC ............................ 52/144, 145; 181/284, 286
See application file for complete search history.

(56) References Cited

U.S. PATENT DOCUMENTS 1,959,057 A * 5/1934 Kliefoth .................... E04B 1/86 156/92
2,459,121 A * 1/1949 Willey ...................... E04B 1/86 D25/160
2,811,133 A 10/1957 Heino
(Continued)

FOREIGN PATENT DOCUMENTS

EP 1079036 A2 2/2001
JP 2003295867 A 10/2003
(Continued)

OTHER PUBLICATIONS

International Search Report for related PCT/US2022/022763, mailed Jul. 18, 2022.

*Primary Examiner* — Brian E Glessner
*Assistant Examiner* — Adam G Barlow
(74) *Attorney, Agent, or Firm* — Patrick Sheldrake

(57) ABSTRACT

Described herein is an acoustic building panel having a first major exposed surface opposite a second major exposed surface and a side exposed surface extending there between, the acoustic ceiling panel comprising: a body comprising a first major surface opposite a second major surface and a side surface extending between the first and second major surfaces, the body being air-permeable; and an attenuation coating applied to the first major surface of the body; wherein a first portion of the second major exposed surface of the acoustic building panel is formed by the first major surface of the body and a second portion of the second major exposed surface of the acoustic building panel is formed by the attenuation coating.

13 Claims, 11 Drawing Sheets

(56) References Cited

U.S. PATENT DOCUMENTS

| | | | | |
|---|---|---|---|---|
| 2,931,214 | A * | 4/1960 | Maccaferri | E04B 1/8409 52/390 |
| 3,908,059 | A | 9/1975 | Prince | |
| 4,070,987 | A | 1/1978 | Gross | |
| 4,194,329 | A * | 3/1980 | Wendt | B32B 3/266 52/409 |
| 5,185,197 | A * | 2/1993 | Nixon | B32B 17/02 428/920 |
| 7,862,687 | B2 | 1/2011 | Englert | |
| 7,879,433 | B1 * | 2/2011 | Felegi, Jr. | E04B 1/86 181/290 |
| 8,424,251 | B1 | 4/2013 | Tinianov | |
| 9,702,142 | B1 * | 7/2017 | Wang | E04B 1/86 |
| 10,208,477 | B2 | 2/2019 | McCartney | |
| 12,054,945 | B2 * | 8/2024 | Line | E04B 1/86 |
| 2004/0062898 | A1 * | 4/2004 | Felegi, Jr. | C09D 7/61 428/44 |
| 2007/0055012 | A1 * | 3/2007 | Caldwell | C09D 7/61 525/54.1 |
| 2007/0277948 | A1 * | 12/2007 | Carbo | E04B 9/045 162/204 |
| 2008/0050565 | A1 * | 2/2008 | Gross | D21H 21/34 427/407.1 |
| 2008/0121461 | A1 * | 5/2008 | Gross | D06M 11/82 442/334 |
| 2010/0066121 | A1 * | 3/2010 | Gross | G10K 11/162 442/364 |
| 2014/0262603 | A1 * | 9/2014 | Johnson | E01F 8/0017 181/211 |
| 2017/0121964 | A1 * | 5/2017 | Wiker | E04B 9/067 |
| 2018/0079691 | A1 * | 3/2018 | Donelan | C04B 30/02 |
| 2019/0153723 | A1 | 5/2019 | Tinianov | |
| 2019/0338516 | A1 * | 11/2019 | Ray | B32B 5/028 |
| 2019/0382589 | A1 * | 12/2019 | Li | C09D 1/02 |
| 2020/0002941 | A1 * | 1/2020 | Oleske | E04B 1/86 |
| 2020/0325680 | A1 * | 10/2020 | Pham | B32B 5/02 |

FOREIGN PATENT DOCUMENTS

| | | | |
|---|---|---|---|
| KR | 2014/0006442 | A | 1/2014 |
| WO | WO 2016/144504 | A1 | 9/2016 |

* cited by examiner

ACOUSTIC BUILDING PANELS

CROSS-REFERENCE TO RELATED APPLICATIONS

This application claims the benefit of U.S. Provisional Application No. 63/169,694, filed on Apr. 1, 2021. The disclosure of the above application is incorporated herein by reference.

BACKGROUND

Various types of ceiling systems have been used in commercial and residential building construction to provide the desired acoustical performance. Noise blocking between rooms is required for a variety of purposes, including speech privacy as well as not bothering the occupants of adjacent rooms. Sound dampening within a single room is also required for a variety of purposes, including improving speech comprehension and decreasing volume levels within a single space.

Previous attempts have been made to improve noise blocking between adjacent rooms. However, such previous attempts either lack noise reducing performance or are limited by the maximum sound attenuation that can be achieved. Thus, there is a need for a new acoustic building panel exhibiting the desired enhanced acoustical properties.

BRIEF SUMMARY

In some embodiments, the present invention is directed to an acoustic building panel having a first major exposed surface opposite a second major exposed surface and a side exposed surface extending there between, the acoustic ceiling panel comprising: a body comprising a first major surface opposite a second major surface and a side surface extending between the first and second major surfaces, the body being air-permeable; and an attenuation coating applied to the second major surface of the body; wherein a first portion of the second major exposed surface of the acoustic building panel is formed by the second major surface of the body and a second portion of the second major exposed surface of the acoustic building panel is formed by the attenuation coating.

Other embodiments of the present invention include an acoustic building panel having a first major exposed surface opposite a second major exposed surface and a side exposed surface extending there between, the acoustic ceiling panel comprising: a body that is air-permeable, the body comprising a first major surface opposite a second major surface and a side surface extending there between, the side surface comprising: a lower edge portion adjacent to the first major surface; and an upper edge portion adjacent to the second major surface; an attenuation coating applied to the lower edge portion; wherein a first portion of the side exposed surface of the acoustic building panel is formed by the upper edge portion of the side surface of the body, and a second portion of the side exposed surface of the acoustic building panel is formed by the attenuation coating.

Other embodiments of the present invention include an acoustic building panel having a first major exposed surface opposite a second major exposed surface and a side exposed surface extending there between, the acoustic ceiling panel comprising: a body comprising a first major surface opposite a second major surface and a side surface extending between the first and second major surfaces, the body being air-permeable; an attenuation coating applied to the first major surface of the body; a plurality of apertures extending through the attenuation coating into the body; and wherein the second major exposed surface of the acoustic building panel comprises the attenuation coating and the plurality of apertures.

Other embodiments of the present invention include a ceiling system comprising: a ceiling grid comprising a plurality of first members and a plurality of second members, the first and second members intersecting one another to define a plurality of grid openings; a plenary space above the ceiling grid; a room environment below the ceiling grid; and at least one of the aforementioned acoustical building panels mounted to the ceiling grid and positioned within the grid opening; and wherein the second major exposed surface of the acoustical building panel faces the plenary space.

Other embodiments of the present invention include a method of forming an acoustic building panel comprising: a) applying an attenuation coating composition to a second major surface of a body in a discontinuous pattern, the body being air-permeable and comprising a first major surface opposite the second major surface and a side surface extending between the first and second major surfaces, b) drying the attenuation coating composition to form the acoustic building panel; and whereby the discontinuous pattern is such that at least a portion of the second major surface of the body is uncoated by the attenuation coating after step b).

Other embodiments of the present invention include a method of forming an acoustic building panel comprising: a) applying a coating composition to a side surface of a body that is air-permeable, the body having a first major surface opposite a second major surface and the side surface extending there-between, the side surface comprising a lower edge portion adjacent to the first major surface and an upper edge portion adjacent to the second major surface; b) drying the coating composition to form an attenuation coating on the acoustic building panel; and wherein the coating composition applied in step a) such that the coating is present on the lower edge portion and wherein after step b) at least a portion of the upper edge portion is free of the attenuation coating.

Other embodiments of the present invention include a method of forming an acoustic building panel comprising: a) applying an attenuation coating composition to a second major surface of a body, the body comprising a first major surface opposite the second major surface and a side surface extending between the first and second major surfaces, b) drying the attenuation coating composition; c) forming a plurality of apertures into the attenuation coating to form the acoustic building panel; and whereby the acoustic building panel comprises a first major exposed surface opposite a second major exposed surface, wherein the plurality of apertures extend from the second major exposed surface to the body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
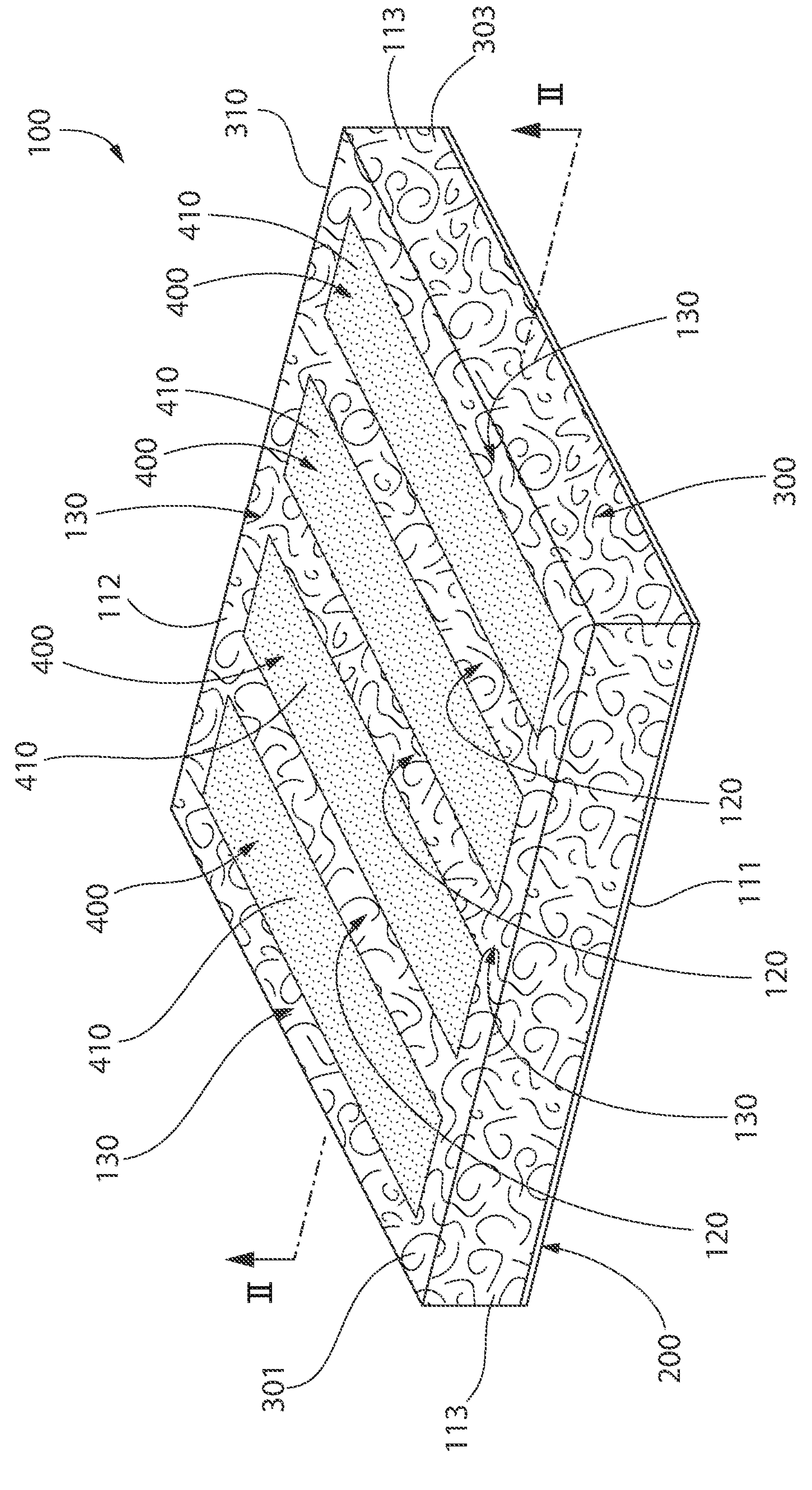
FIG. 1 is a perspective view of an acoustic building panel according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top,” and “bottom” as well as derivatives thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation unless explicitly indicated as such.

Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term “about” means+/−5% of the reference value. According to the present application, the term “substantially free” less than about 0.1 wt. % based on the total of the referenced value.

Referring to FIG. 1, the present invention includes a coated building panel 100 (referred to herein as “building panel”) comprising a first major exposed surface 111 opposite a second major exposed surface 112 and a side exposed surface 113 that extends between the first major exposed surface 111 and the second major exposed surface 112, thereby defining a perimeter 310 of the ceiling panel 100.

Figure 6:
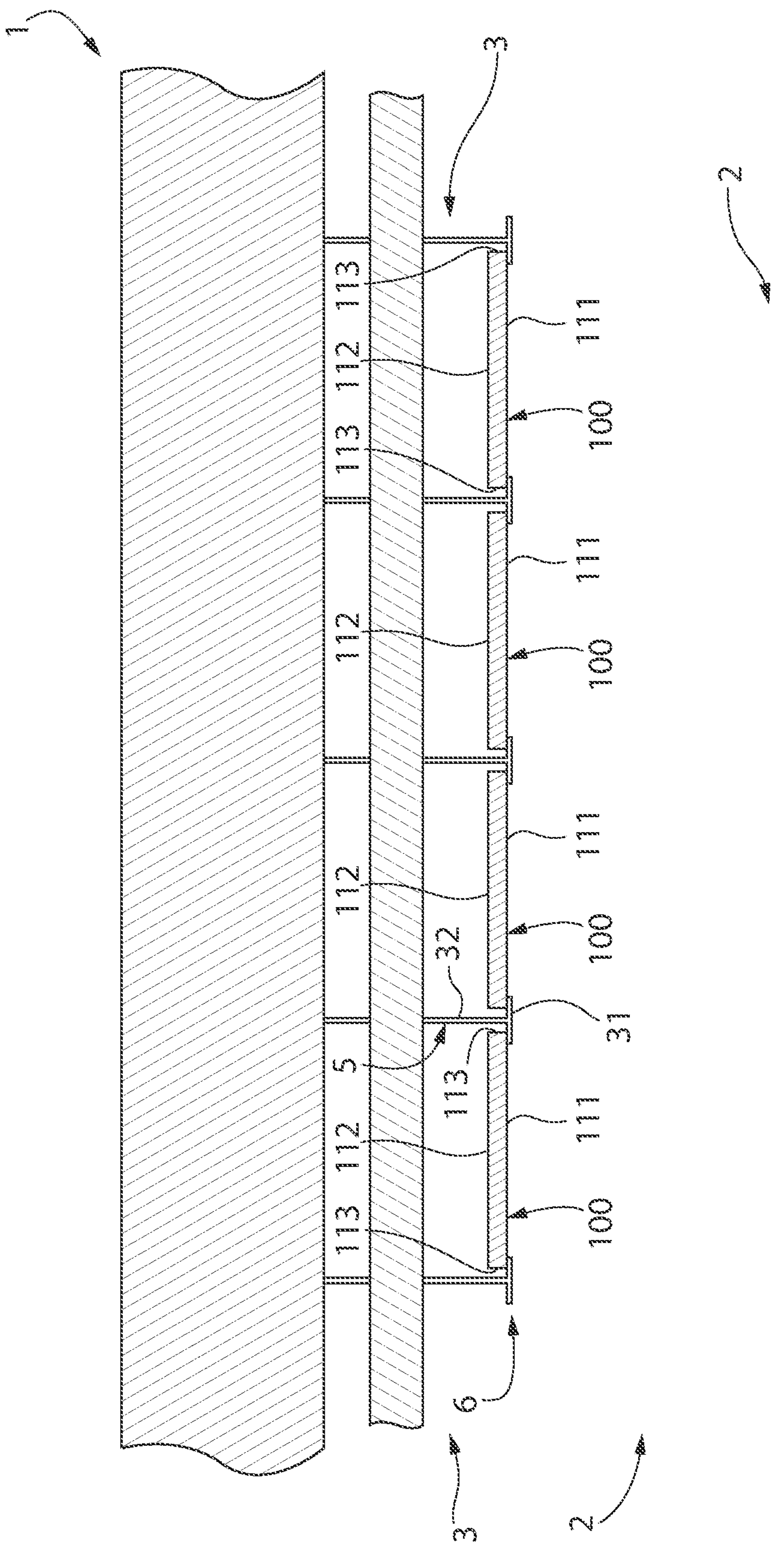
FIG. 6 is a building system according to an alternative embodiment of the present invention.
Figure 7:
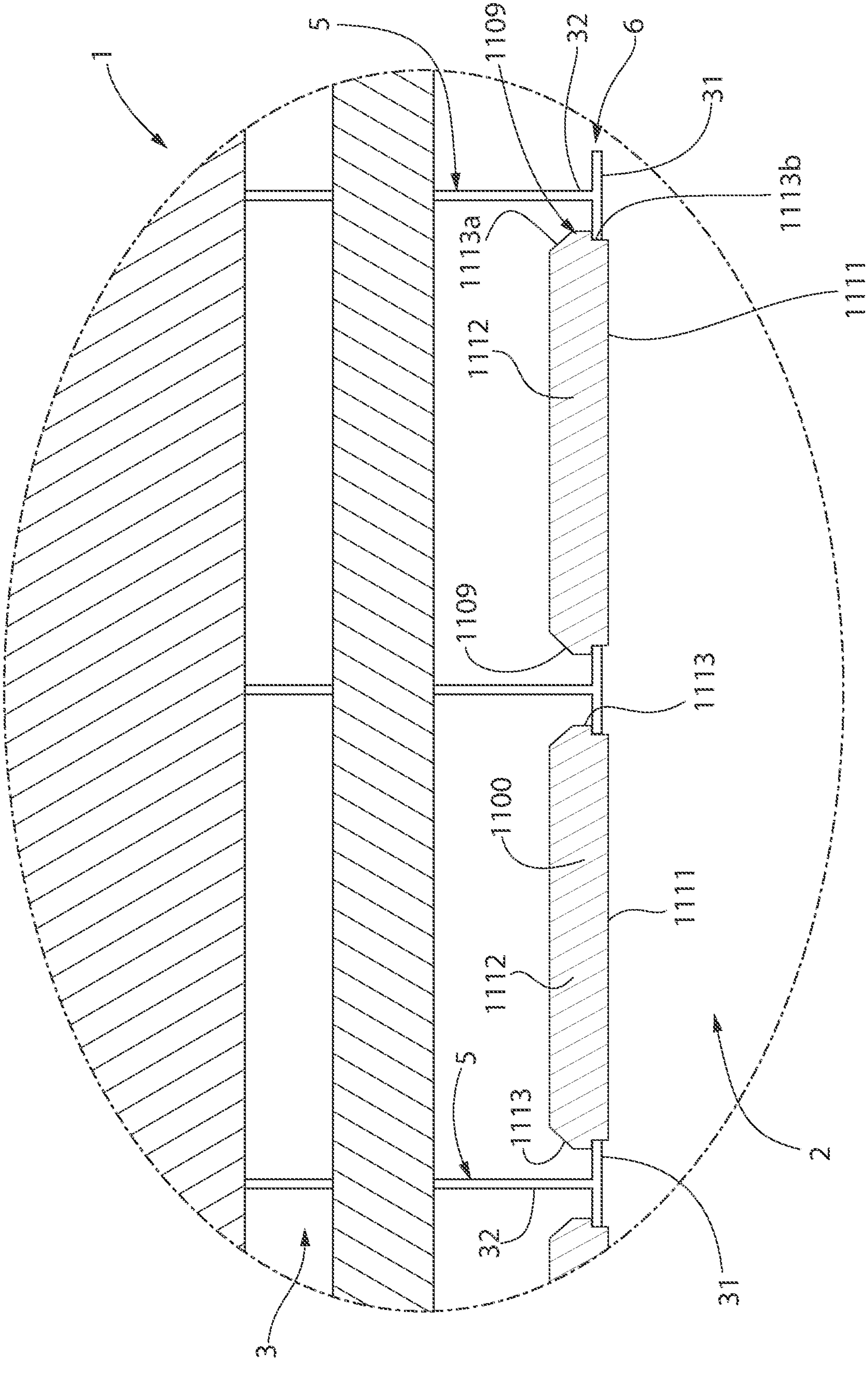
FIG. 7 is a close-up view of the building system of FIG. 6 in region VII.

Referring to FIG. 6, the present invention may further include a ceiling system 1 comprising one or more of the building panels 100 installed in an interior space, whereby the interior space comprises a plenum space 3 and an active room environment 2. The plenum space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.).

In the installed state, the building panels 100 may be supported in the interior space by one or more parallel support struts 5. Each of the support struts 5 may comprise an inverted T-bar having a horizontal flange 31 and a vertical web 32. The ceiling system 1 may further comprise a plurality of first struts that are substantially parallel to each other and a plurality of second struts that are substantially perpendicular to the first struts (not pictured). In some embodiments, the plurality of second struts intersects the plurality of first struts to create an intersecting ceiling support grid 6. The plenum space 3 exists above the ceiling support grid 6 and the active room environment 2 exists below the ceiling support grid 6.

In the installed state, the first major exposed surface 111 of the building panel 100 may face the active room environment 2 and the second major exposed surface 112 of the building panel 100 may face the plenum space 3. The building panel 100 may be installed according to at least two variations. In a first variation, the building panel 100 is positioned entirely above the horizontal flange 31 of the support struts 5—as shown in FIG. 6. In the first variation, at least a portion of the first major surface may be concealed from the active room environment 2 by the horizontal flange 31 because the horizontal flange 31 contacts the first major exposed surface 111, thereby supporting it in the ceiling system 1. In the first variation, the entire side exposed surface 113 of the building panel 100 may be concealed from the active room environment 2 by the horizontal flange 311. The second variation will be described further herein.

Figure 2:
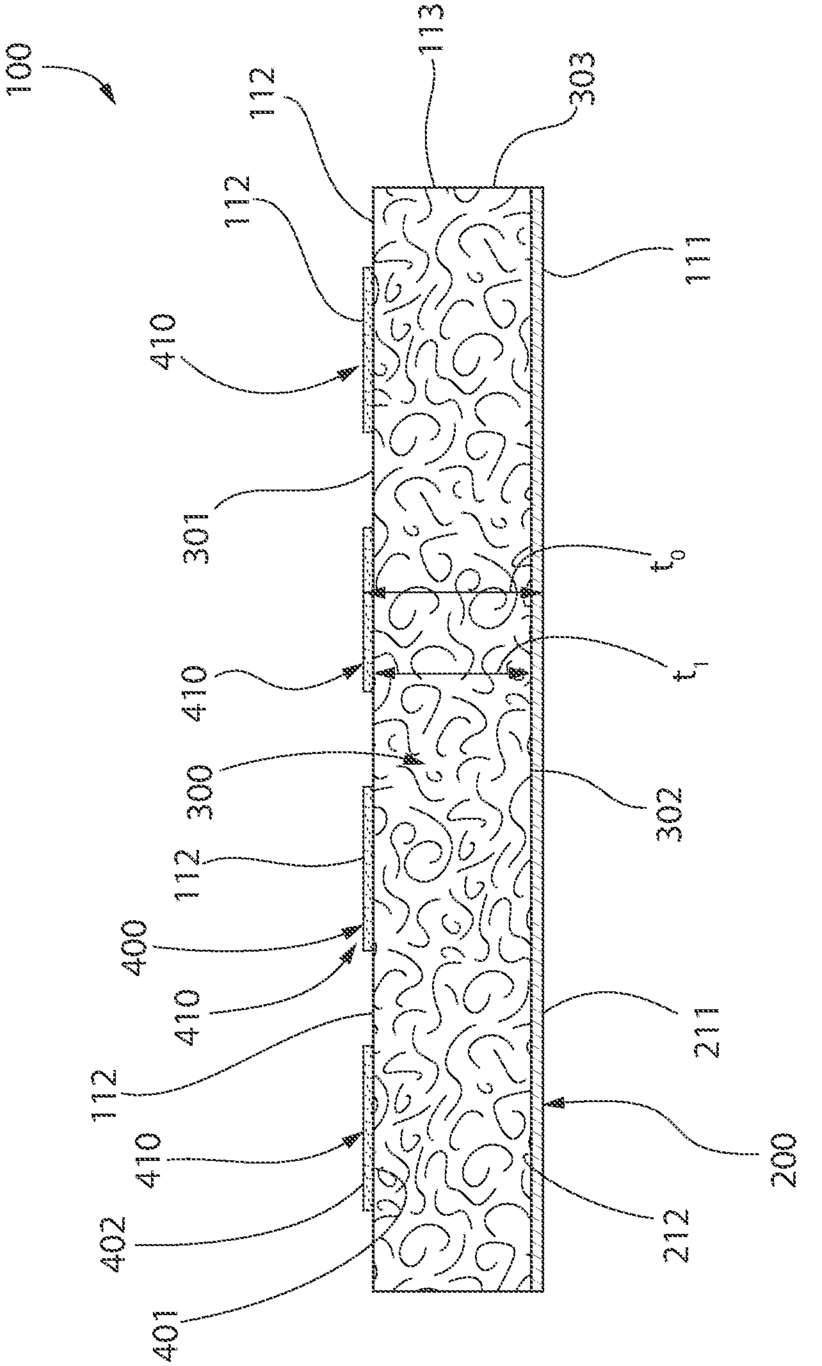
FIG. 2 is a cross-sectional view of the acoustic building panel of FIG. 1 along line II-II.

Referring now to FIGS. 1 and 2, the building panel 100 of the present invention may have a panel thickness $t_0$ as measured from the first major exposed surface 111 to the second major exposed surface 112. The panel thickness $t_0$ may range from about 12 mm to about 40 mm—including all values and sub-ranges there-between. The building panel 100 may have a length $L_P$ ranging from about 30 cm to about 310 cm—including all values and sub-ranges there-between. The building panel 100 may have a width $W_P$ ranging from about 10 cm to about 125 cm—including all values and sub-ranges there-between.

The building panel 100 may comprise a body 300 and an attenuation coating 400 applied thereto. In some embodiments, the building panel 100 may further comprise a face coating 200 applied to the body 300—as discussed further herein. The body 300 comprises a first major surface 301 opposite a second major surface 302 and a body side surface 303 that extends between the first major surface 301 and the second major surface 302, thereby defining a perimeter 310 of the body 300. The body 300 may be comprised of a binder and fibers. In some embodiments, the body 300 may further comprise a filler and/or additive.

The attenuation coating 400 may be applied to the first major surface 301 of the body 300. The face coating 200 may be applied to the second major surface 302 of the body 300. The body 300 may have a body thickness ti that extends from the first major surface 301 to the second major surface 302. The body thickness ti may range from about 12 mm to about 40 mm—including all values and sub-ranges there-between.

The face coating 200 may comprise a binder—such as a polymeric binder—pigments, and processing additives. The face coating 200 may be present in an amount ranging from about 50 $g/m^2$ to about 900 $g/m^2$—including all amounts and sub-ranges there-between. The face coating 200 may comprise an upper surface 212 opposite a lower surface 211. The face coating 200 may be applied such that the lower surface 211 forms the first major exposed surface 111 of the building panel 100. The face coating 200 may have a solid's content of about 100 wt. %.

The face coating 200 may be applied in a wet-state—i.e., with the addition of a liquid carrier as a face coating composition. The face coating composition may comprise a solid's content of about 40 wt. % to about 60 wt. % including all sub-ranges and percentages there-between. In some embodiments, the face coating composition may comprise a solid's content of about 50 wt. %.

Although not shown, the building panel 100 of the present invention may further comprise a non-woven scrim. The non-woven scrim may comprise an upper surface opposite a lower surface. The lower surface of the non-woven scrim may be positioned immediately adjacent to and in direct contact with the second major surface 302 of the body 300. The face coating 200 may be applied to the non-woven scrim such that the upper surface 212 of the face coating 200 is in direct contact with the upper surface of the non-woven scrim.

The body 300 may be porous, thereby allowing airflow through the body 300 between the first major surface 301 and the second major surface 302—as discussed further herein. According to the present invention, the term porous refers to the body 300 being porous enough to allow for enough airflow through the body 300 (under atmospheric conditions) for the body 300 and the resulting building panel 100 to function as an acoustic building panel 100 and for the corresponding building system 1 to function as an acoustic building system 1, which requires properties related to noise reduction and sound attenuation properties—as discussed further herein.

Specifically, the body 300 may have a porosity ranging from about 60% to about 98% —including all values and sub-ranges there between. In a preferred embodiment, the body 300 may have a porosity ranging from about 75% to 95%—including all values and sub-ranges there between.

According to the embodiments where the body 300 is formed from binder and fibers, porosity may be calculated by the following:

$$\% \text{ Porosity}=[V_{Total}-(V_{Binder}+V_F+V_{Filler})]/V_{Total}$$

Where $V_{Total}$ refers to the total volume of the body 300 defined by the first major surface first major surface 301, the second major surface 302, and the side surfaces 303 of the body 300. $V_{Binder}$ refers to the total volume occupied by the binder in the body 300. $V_F$ refers to the total volume occupied by the fibrous component in the body 300. $V_{Filler}$ refers to the total volume occupied by the filler and/or pigment in the body 300. Thus, the % porosity represents the amount of free volume within the body 300.

The body 300 of the present invention may exhibit sufficient airflow for the body 300—and resulting coated building panel 100—to have the ability to reduce the amount of reflected sound in an active room environment 2. The reduction in amount of reflected sound in an active room environment 2 is expressed by a Noise Reduction Coefficient (NRC) rating as described in American Society for Testing and Materials (ASTM) test method C423. This rating is the average of sound absorption coefficients at four ⅓ octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection.

The body 300 of the present invention exhibits an NRC of at least about 0.5. In a preferred embodiment, the body 300 of the present invention may have an NRC ranging from about 0.60 to about 0.99—including all value and sub-ranges there-between.

In addition to reducing the amount of reflected sound in a single active room environment 2, the body 300 may also be able to exhibit superior sound attenuation—which is a measure of the sound reduction between an active room environment 2 and a plenary space 3. The ASTM has developed test method E1414 to standardize the measurement of airborne sound attenuation between room environments 2 sharing a common plenary space 3. The rating derived from this measurement standard is known as the Ceiling Attenuation Class (CAC). Ceiling materials and systems having higher CAC values have a greater ability to reduce sound transmission through the plenary space 3—i.e. sound attenuation function. The body 300 of the present invention may exhibit a CAC value of 30 or greater.

Non-limiting examples of binder that may form the body 300 may include a starch-based polymer, polyvinyl alcohol (PVOH), a latex, polysaccharide polymers, cellulosic polymers, protein solution polymers, an acrylic polymer, polymaleic anhydride, epoxy resins, or a combination of two or more thereof. Non-limiting examples of filler may include powders of calcium carbonate, limestone, titanium dioxide, sand, barium sulfate, clay, mica, dolomite, silica, talc, perlite, polymers, gypsum, wollastonite, expanded-perlite, calcite, aluminum trihydrate, pigments, zinc oxide, or zinc sulfate.

Non-limiting examples of fibers that may form the body 300 may include organic fibers, inorganic fibers, or a blend thereof. Non-limiting examples of inorganic fibers mineral wool (also referred to as slag wool), rock wool, stone wool, and glass fibers. Non-limiting examples of organic fiber include fiberglass, cellulosic fibers (e.g. paper fiber—such as newspaper, hemp fiber, jute fiber, flax fiber, wood fiber, or other natural fibers), polymer fibers (including polyester, polyethylene, aramid—i.e., aromatic polyamide, and/or polypropylene), protein fibers (e.g., sheep wool), and combinations thereof.

Figure 3:
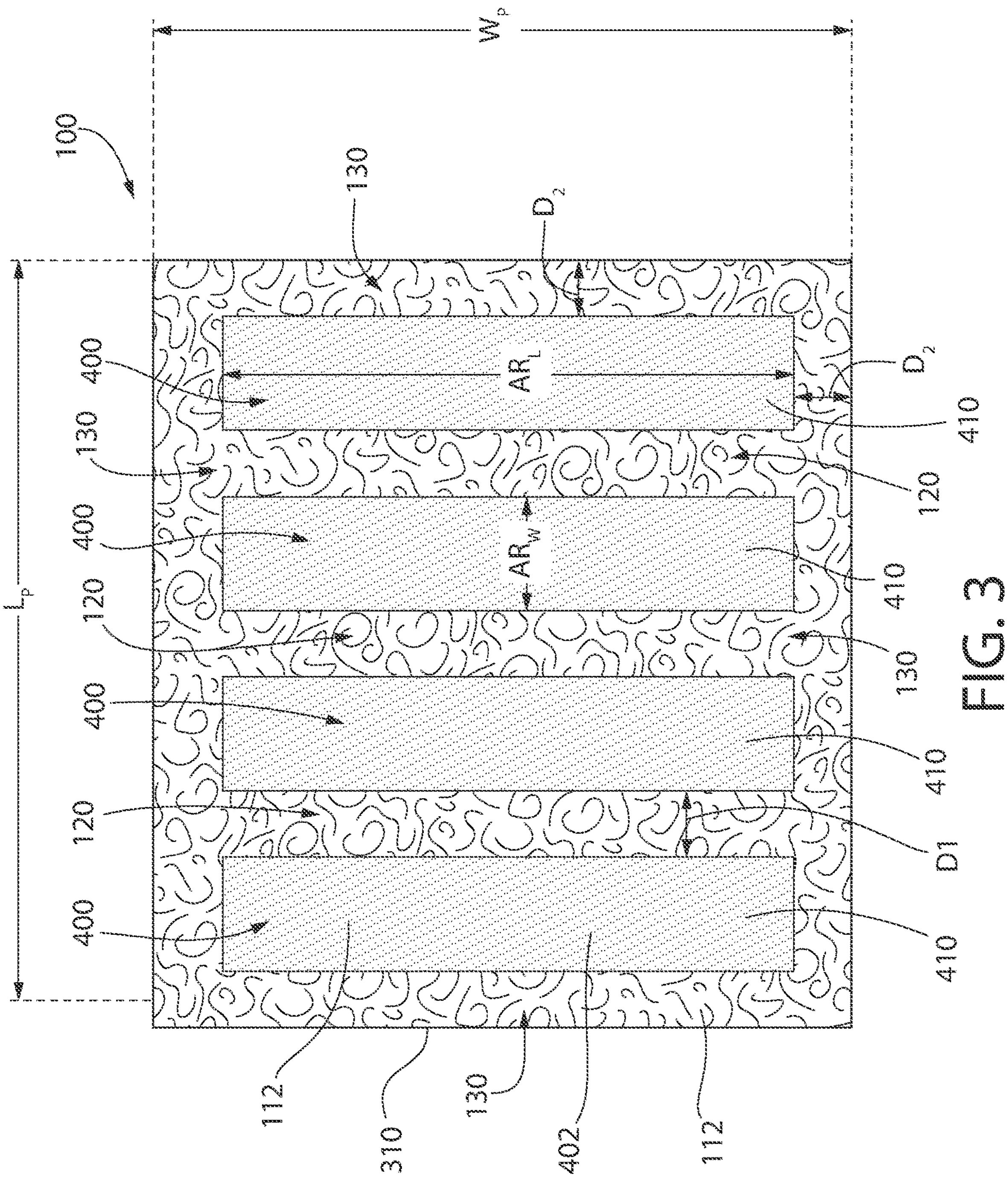
FIG. 3 is a top view of the acoustic building panel of FIG. 1.

Referring now to FIGS. 1-3, the acoustic building panel 100 further comprises an attenuation coating 400 applied to the body 300. The attenuation coating 400 may be applied to the first major surface 301 of the body 300—as discussed in greater detail herein.

The attenuation coating 400 may comprise a polymer binder. The polymeric binder may be present in an amount ranging from about 1 wt. % to about 20 wt. % based on the total weight of the dry-state attenuation coating 400—including all percentages and sub-ranges there-between. Non-limiting examples of binder may include a starch-based polymer, polyvinyl alcohol (PVOH), a latex, polysaccharide polymers, polyvinyl acetate, cellulosic polymers, protein solution polymers, an acrylic polymer, polymaleic anhydride, epoxy resins, or a combination of two or more thereof.

The attenuation coating may comprise a filler. The filler may be present in an amount ranging from about 30 wt. % to about 99 wt. % based on the total weight of the dry-state attenuation coating 400—including all percentages and sub-ranges there-between. In a preferred embodiment, the filler may be present in an amount ranging from about 50 wt. % to about 99 wt. % based on the total weight of the dry-state attenuation coating 400—including all percentages and sub-ranges there-between. Non-limiting examples of filler may include pigments, powders of calcium carbonate, including limestone, titanium dioxide, sand, barium sulfate, clay, mica, dolomite, silica, talc, perlite, polymers, gypsum, wollastonite, glass, expanded-perlite, calcite, aluminum trihydrate, pigments, zinc oxide, or zinc sulfate.

In a non-limiting example, the attenuation coating 400 may be applied in the wet-state to the first air-permeable body 300 by spray, roll, curtain coating, screen printing, extrusion coating, or dip application. The attenuation coating 400 may comprise a liquid carrier in the wet-state that is present in an amount ranging from about 20 wt. % to about 60 wt. % based on the total weight of the wet-state attenuation coating—including all percentages and sub-ranges there-between. The attenuation coating 400 may have a solids content in the wet-state that ranges from about 40 wt. % to about 80 wt. % based on the total weight of the wet-state attenuation coating—including all percentages and sub-ranges there-between.

The attenuation coating 400—in the dry state, i.e., a solids content of about 100 wt. % —may be present atop the first major surface 301 of the body 300 in an amount ranging from about 100 $g/m^2$ to about 600 $g/m^2$—including all amounts and sub-ranges there-between. In some embodiments, the attenuation coating 400 may be present atop the first major surface 301 of the body 300 in an amount ranging from about 90 $g/m^2$ to about 500 $g/m^2$—including all amounts and sub-ranges there-between.

Once applied, the combination of the attenuation coating 400 and the body 300 form the acoustical panel 100—whereby the acoustical panel 100 exhibits enhanced attenuation properties due to the presence of the attenuation coating 400—as discussed further herein.

The second major exposed surface 112 of the building panel 100 may be formed by both of the attenuation coating 400 and the first major surface 301 of the body 300. Stated otherwise, the second major exposed surface 112 of the building panel 100 may comprise the attenuation coating 400 and the first major surface 301 of the body 300.

The attenuation coating 400 may comprise an upper surface 402 opposite a lower surface 401. The lower surface 401 of the attenuation coating may face the first major surface 301 of the body 300. The second major exposed surface 112 of the building panel 100 may comprise the upper surface 402 of the attenuation coating 400.

The attenuation coating 400 may be applied in a plurality of attenuation regions 410 atop the first major surface 301 of the body 300. Each of the attenuation regions 410 may be a discrete region that is entirely separated by adjacent ones of the attenuation regions 410 by a separation distance $D_1$. The separation distance $D_1$ may be a non-zero, positive value. The separation distance $D_1$ may range from about 2 mm to about 22 mm—including all amounts and sub-ranges there-between.

Each of the plurality of attenuation regions 410 may have a polygonal shape—for example, but not limited to, a rectangle. In other embodiments, the attenuation regions 410 may have a non-polygonal shape—such as a circle, oval, or the like.

In a non-limiting embodiment, each of the attenuation regions 410 may be an elongated polygonal shape that extend substantially parallel to the body 300 along the direction of the width $W_P$ of the building panel 100. In other non-limiting embodiments, each of the discrete regions may be an elongated polygonal shape that extend substantially parallel to the body 300 along the direction of the length $L_P$ of the building panel 100.

The plurality of attenuation regions 410 may include at least two attenuation regions 410 applied atop the first major surface 301 of the body 300. In some embodiments, the plurality of discrete regions may include at least three attenuation regions 410 applied atop the first major surface 301 of the body 300. In some embodiments, the plurality of attenuation regions 410 may include at least four attenuation regions 410 applied atop the first major surface 301 of the body 300.

Each of the attenuation regions 410 may have a length $AR_L$ and a width $AR_W$. The length $AR_L$ of each attenuation region 410 may range from about 250 mm to about 1200 mm—including all distances and sub-ranges there-between. The width $AR_W$ of each attenuation region 410 may range from about 28 mm to about 280 mm—including all distances and sub-ranges there-between. A ratio of the length $AR_L$ and width $AR_W$ of each attenuation region 410 may range from about 40:1 to about 5:1—including all ratios and sub-ranges there-between.

The building panel 100 may further comprise a plurality of offset regions 120 located between adjacent attenuation regions 410. The offset regions 120 may have a width that is substantially equal to the separation distance $D_1$ and a length that is substantially equal to the length $AR_L$ of each attenuation region 410.

A ratio of the width $AR_W$ of each attenuation region 410 to the separation distance $D_1$ may range from about 15:1 to about 4:1—including all ratios and sub-ranges there-between.

A ratio of the building panel 100 width $W_P$ and the separation distance $D_1$ may range from about 15:1 to about 3:2—including all ratios and sub-ranges there-between. A ratio of the building panel 100 length $L_P$ and the separation distance $D_1$ may range from about 600:1 to about 50:1—including all ratios and sub-ranges there-between.

Each of the outermost attenuation regions 410 may be offset and located inwards from the perimeter 310 of the body 300 by a perimeter region 130. The perimeter region 130 may span a perimeter distance $D_2$ that ranges from about 0 mm to about 15 mm—including all amounts and sub-ranges there-between.

A ratio of the width $W_P$ of the building panel 100 and the perimeter distance $D_2$ of the perimeter region 130 may range from about 1:18 to about 1:4—including all ratios and sub-ranges there-between. A ratio of the length $L_P$ of the building panel 100 and the perimeter distance $D_2$ of the perimeter region 130 may range from about 1:4 to about 1:2—including all ratios and sub-ranges there-between.

A ratio of the length $L_P$ of the building panel 100 to the length $AR_W$ of each attenuation region 410 may range from about 1:1 to about 3:2—including all ratios and sub-ranges there-between. A ratio of the width $W_P$ of the building panel 100 and the width $AR_W$ of each attenuation region 410 may range from about 500:1 to about 6:1—including all ratios and sub-ranges there-between.

The second major exposed surface 112 of the building panel 100 may have an overall surface area. The first major surface 301 of the body 300 may also have an overall surface area that is substantially equal to the overall surface area of the second major exposed surface 112 of the building panel. The overall surface area of the second major exposed surface 112 of the building panel 100 may be substantially equal to the product of the building panel length $L_P$ and the building panel width $W_P$ (i.e., $L_P \times W_P$=overall surface area). The overall surface area of the second major exposed surface 112 may be substantially equal to the surface area located within the perimeter 310 of the body 300 on the first major surface 301.

Each of the plurality of attenuation regions 410 may occupy a fraction of the overall surface area of the second major exposed surface 112 of the building panel 100—whereby the summation of the surface areas of the plurality of attenuation regions 410 is a first surface area. Stated otherwise, the attenuation coating 400 occupies a first surface area on the building panel 100—whereby the first surface area is the summation of each individual surface area of each one of the plurality of attenuation regions 410.

The first surface area may be less than the overall surface area of the second major exposed surface 112 of the building panel 100. In some embodiments, the first surface area is equal to about 80% to about 99% of the overall surface area of second major exposed surface 112 of the building panel 100—including all percentages and sub-ranges there-between. In some embodiments, the first surface area is equal to about 92% to about 98% of the overall surface area of the second major exposed surface 112 of the building panel 100—including all percentages and sub-ranges there-between.

The plurality of perimeter regions 130 and the plurality of offset regions 120 may further occupy a fraction of the overall surface area of the second major exposed surface 112 of the building panel 100—whereby the summation of the surface areas of the perimeter regions 130 and the plurality of offset regions 120 is a second surface area.

The second surface area may be calculated as the difference in the overall surface area of the second major exposed surface 112 of the building panel 100 and the first surface area of the plurality of attenuation regions 410.

The second surface area may be the fraction of the second major exposed surface 112 of the building panel 100 that is formed by the first major surface 301 of the body 300. Stated otherwise, the second surface area is equal to the portion of the first major surface 301 of the body 300 that is exposed to form a portion of the second major exposed surface 112 of the building panel 100.

The second surface area may be less than the overall surface area. In some embodiments, the second surface area is equal to about 1% to about 20% of the overall surface area of the second major exposed surface 112 of the building panel 100—including all percentages and sub-ranges there-between. In some embodiments, the second surface area is equal to about 2% to about 8% of the overall surface area of the second major exposed surface 112 of the building panel 100— including all percentages and sub-ranges there-between. The first surface area and the second surface area may sum to be substantially equal to the overall surface area.

A ratio of the first surface area to the second surface area may ranging from about 99:1 to about 4:1—including all ratios and sub-ranges there-between. In some embodiments, the ratio of the first surface area to the second surface area may ranging from about 49:1 to about 11:1— including all ratios and sub-ranges there-between.

As discovered herein, the addition of an attenuation coating 400 in the form of a plurality of discrete attenuation regions 410 allows for a fine-tuning of sound attenuation properties of the building panel 100 and resulting building system 1 without substantial sacrifice to airflow properties necessary for sound reducing characteristics of such panels 100 and related ceiling systems 1. Specifically, by tailoring the number of individual attenuation regions 410, the dimensions of such attenuation regions $AR_L$, $AR_W$, and the distance from which such attenuation regions 410 may be offset from each other (by the offset distance $D_1$) and/or offset from the perimeter 310 of the body 300 of the building panel 300 (by the perimeter distance $D_2$), the attenuation coating 400 of the present invention provides a dynamic approach to better controlling CAC performance of a building panel 100 while also properly counter balancing NRC performance by not completely sacrificing airflow characteristics of the building panel 100 between the first major exposed surface 111 and the second major exposed surface 112.

Figure 4:
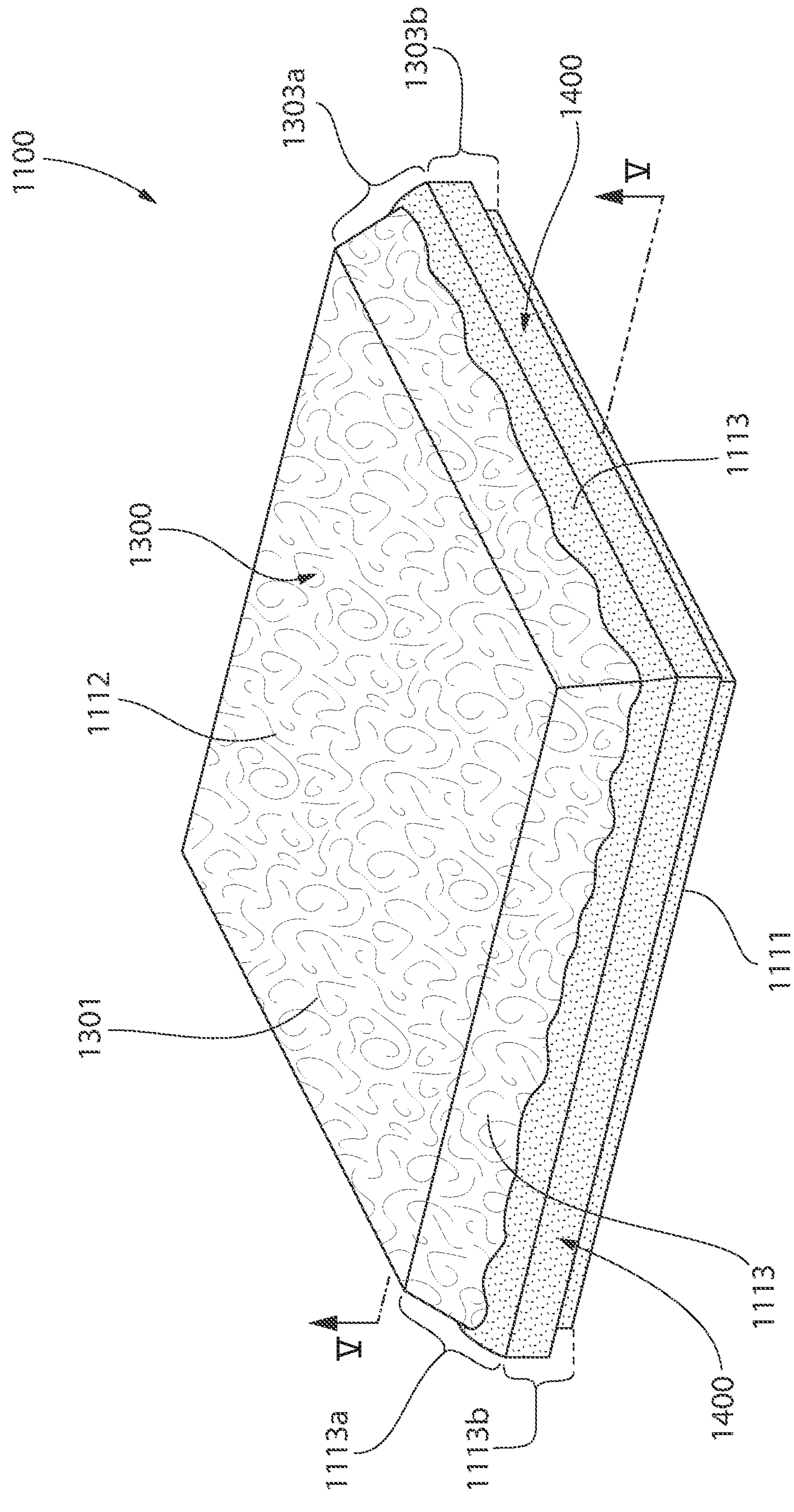
FIG. 4 is a perspective view of an acoustic building panel according to another embodiment of the present invention.
Figure 5:
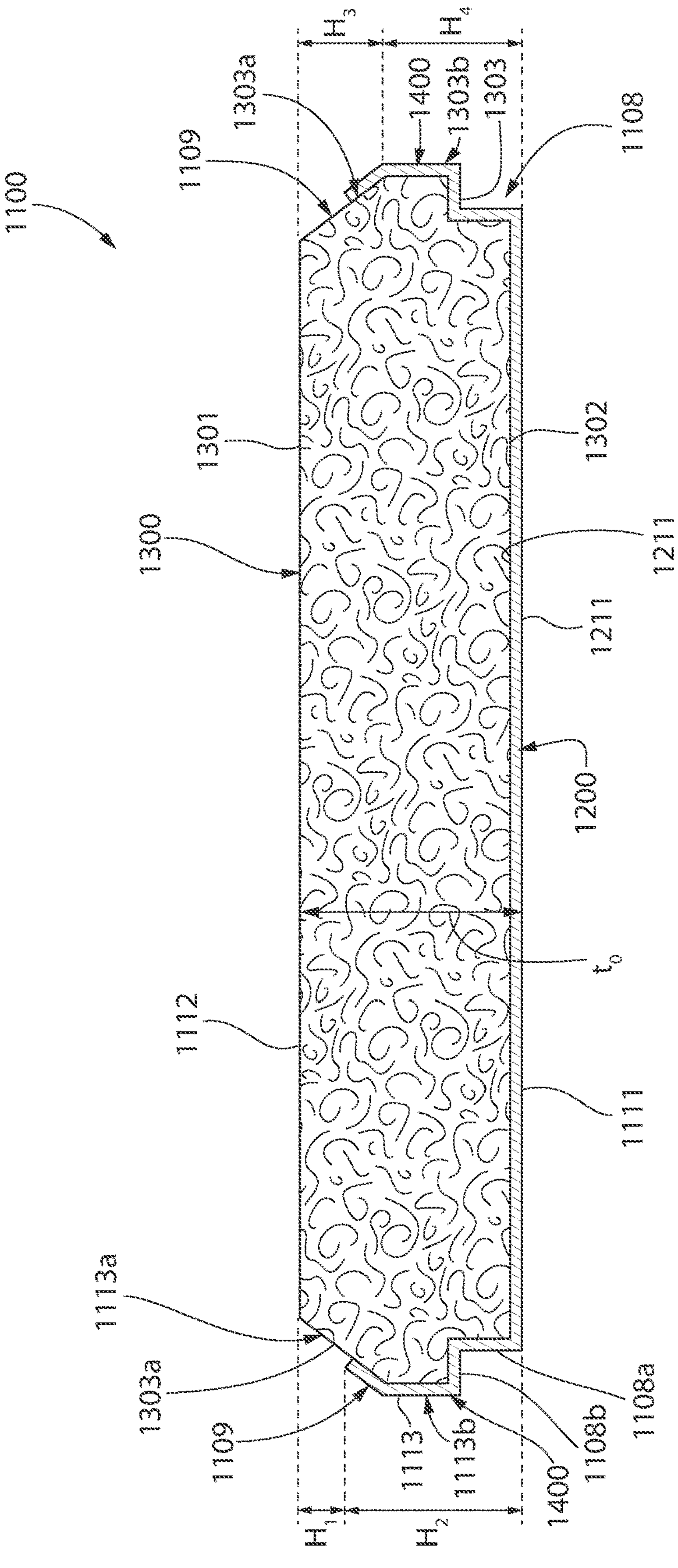
FIG. 5 is a cross-sectional view of the acoustic building panel of FIG. 4 along line V-V.

Referring now to FIGS. 4 and 5, a building panel 1100 is illustrated in accordance with another embodiment of the present invention. The building panel 1100 is similar to the building panel 100 except as described herein below. The description of the building panel 100 above generally applies to the building panel 1100 described below except with regard to the differences specifically noted below. A similar numbering scheme will be used for the building panel 1100 as with the building panel 100 except that the 1000-series of numbers will be used.

The building panel 1100 may comprise a first major exposed surface 1111 opposite a second major exposed surface 1112 and a side exposed surface 1113 extending there-between. The side exposed surface 1113 may comprise a first portion 1113*a* and a second portion 1113*b*. The first portion 1113*a* of the side exposed surface 1113 may be located immediately adjacent to the first major exposed surface 1111 of the building panel 1100, and the second portion 1113*b* of the side exposed surface 1113 may be located immediately adjacent to the second major exposed surface 1112 of the building panel 1100.

The building panel 1000 may comprise a body 1300 and an attenuation coating 1400 applied thereto. In some embodiments, the building panel 1000 may further comprise a face coating 1200 applied to the body 1300—as discussed further herein.

Although not shown, the building panel 1100 of the present invention may further comprise a non-woven scrim. The non-woven scrim may comprise an upper surface opposite a lower surface. The lower surface of the non-woven scrim may be positioned immediately adjacent to and in direct contact with the second major surface 1302 of the body 1300. The face coating 1200 may be applied to the non-woven scrim such that the upper surface 1212 of the face coating 1200 is in direct contact with the upper surface of the non-woven scrim.

The body 1300 comprises a first major surface 1301 opposite a second major surface 1302 and a body side surface 1303 that extends between the first major surface 1301 and the second major surface 1302. The body side surface 1303 may comprise an upper edge portion 1303*a* and a lower edge portion 1303*b*. The upper edge portion 1303*a* may be located immediately adjacent to the first major surface 1301 of the body 1300 and the lower edge portion 1303*b* may be located immediately adjacent to the second major surface 1302 of the body 1300. The lower edge portion 1303*b* may extend from the second major surface 1302 of the body 1300 directly to the upper edge portion 1303*a*, and the upper edge portion 1303*a* may extend directly to the first major surface 1301 of the body 1300.

The first portion 1113*a* of the side exposed surface 1113 of the building panel 1100 may comprise the upper edge portion 1303*a* of the body 1303. Stated otherwise, the first portion 1113*a* of the side exposed surface 1113 of the building panel 1100 may be formed by the upper edge portion 1303*a* of the body 1303. A portion of the upper edge portion 1303*a* of the body 1303 may form the first portion 1113*a* of the side exposed surface 1113 of the building panel 1100. In some embodiments, the first portion 1113*a* of the side exposed surface 1113 of the building panel 1100 may be substantially free of attenuation coating 1400.

The attenuation coating 1400 may be applied to the body 1300 such that the second portion 1113*b* of the side exposed surface 1113 of the building panel 1100 comprises the attenuation coating 1400. Stated otherwise, the attenuation coating 1400 may be applied to the body 1300 such that the second portion 1113*b* of the side exposed surface 1113 of the building panel 1100 is formed by the attenuation coating 1400.

The side exposed surface 1113 may have an overall height that is substantially equal to the panel thickness $t_0$. The first portion 1113*a* of the side exposed surface 1113 may have a first height $H_1$. The first height $H_1$ of the first portion 1113*a* may range from about 2 mm to about 20 mm—including all heights and subranges therein. The first height $H_1$ of the first portion 1113*a* may be equal to about 5% of the panel thickness $t_0$ to about 50% of the panel thickness $t_0$—including all percentages and sub-ranges therein.

The second portion 1113*b* of the side exposed surface 1113 may have a second height $H_2$. The second height $H_2$ of the second portion 1113*b* may range from about 10 mm to about 45 mm—including all heights and subranges therein. The second height $H_2$ of the second portion 1113*b* may be equal to about 50% to about 95% of the panel thickness $t_0$—including all percentages and sub-ranges therein.

The summation of the first height $H_1$ of the first portion 1113*a* and the second height $H_2$ of the second portion 1113*b* may be substantially equal to the overall height of the side exposed surface 1113.

The upper edge portion 1303*a* of the body side surface 1303 may have a third height $H_3$. The third height $H_3$ of the upper edge portion 13030*a* may range from about 4 mm to about 22 mm—including all heights and subranges therein. The third height $H_3$ of the upper edge portion 1303*a* may be equal to about 12% of the panel thickness $t_0$ to about 60% of the panel thickness $t_0$—including all percentages and sub-ranges therein.

The lower edge portion 1303*b* of the body side surface 1303 may have a fourth height $H_4$. The fourth height $H_4$ of the lower edge portion 13030*b* may range from about 8 mm to about 43 mm—including all heights and subranges therein. The fourth height $H_4$ of the lower edge portion 1303*b* may be equal to about 40% to about 90% of the panel thickness $t_0$—including all percentages and sub-ranges therein.

The summation of the third height $H_3$ of the upper edge portion 1303*a* and the fourth height $H_4$ of the lower edge portion 1303*b* may be substantially equal to the overall height of the side exposed surface 1113.

The lower edge portion 1303*b* of the body side surface 1303 may comprise a tegular edge profile 1108. The tegular edge profile 1108 may comprise a vertical wall 1108*a* and a horizontal ceiling 1108*b*, whereby the vertical wall 1108*a* extends from the first exposed major surface 1111 of the building panel 1100 to the horizontal ceiling 1108*b* and the horizontal ceiling 1108 extends outward from the vertical wall 1108*a*.

The upper edge portion 1303*a* may comprise a bevel edge profile 1109 (also referred to as a "bevel"). The bevel 1109 may extend at an oblique angle relative to both of the second exposed major surface 1112 and the side exposed surface 1113 of the building panel 1100. In a non-limiting example, the bevel 1109 is oriented at an angle ranging from about 30° to about 60°—including all angles and sub-ranges therebetween—relative to one of the second exposed major surface 1112 and the side exposed surface 1113 of the building panel 1100.

The tegular edge profile 1108 may overlap with first portion 1113*a* of the side exposed surface 1113. In some embodiments, the tegular edge profile 1108 may fully overlap with first portion 1113*a* of the side exposed surface 1113. The bevel edge profile 1109 may overlap with second portion 1113*b* of the side exposed surface 1113. In some embodiments, the bevel edge profile 1109 may only partially overlap with second portion 1113*b* of the side exposed surface 1113.

The bevel edge profile 1109 may be formed into the upper edge portion 1303*a* of the body side surface 1303. The bevel edge profile 1109 may overlap with the upper edge profile 1303*a* of the body side surface 1303. The bevel edge profile 1109 may fully overlap with the upper edge profile 1303*a* of the body side surface 1303. The bevel edge profile 1109 may extend a height that is substantially equal to the third height $H_3$ of the upper edge profile 1303*b*.

The tegular edge profile 1108 may be formed into the lower edge profile 1303*b* of the body side surface 1303. The tegular edge profile 1108 may overlap with the lower edge profile 1303*b* of the body side surface 1303. The tegular edge profile 1108 may fully overlap with the lower edge profile 1303*b* of the body side surface 1303. The tegular edge profile 1108 may extend a height that a less than 100% fraction of the fourth height $H_4$ of the upper edge profile 1303*b*.

The attenuation coating 1400 may be applied to the body side surface 1303 such that the attenuation coating 1400 spans along the body side surface 1303 from the first exposed major surface 1111 to a height that is equal to the second height $H_2$ of the second portion 1113*b* of the side exposed surface 1113.

A ratio of the second height $H_2$ of the second portion 1113*b* of the side exposed surface 1113 to the first height $H_1$ of the first portion 1113*a* of the side exposed surface 1113 may range from about 1:50 to about 1:1—including all ratios and sub-ranges therein.

A ratio of the fourth height $H_4$ of the lower edge portion 1303*b* of body side surface 1303 to the third height $H_3$ of the upper edge portion 1303*a* of the body side surface 1303 may range from about 25:1 to about 1:1—including all ratios and sub-ranges therein.

The attenuation coating 1400 may be applied to the lower edge portion 1303*b* of the body 1300. The attenuation coating 1400 may be applied such that the attenuation coating 1400 coats substantially the entirety of the lower edge portion 1303*b* of the body 1300. The attenuation coating 1400 may be applied such that the attenuation coating 1400 continuously coats the entirety of the lower edge portion 1303*b* of the body 1300.

The attenuation coating 1400 may be applied to the upper edge portion 1303*a* of the body 1300. The attenuation coating 1400 may be applied partially to the upper edge portion 1303*a* of the body 1300. The attenuation coating 1400 may be applied partially to the upper edge portion 1303*a* of the body 1300 such that the first portion 1113*a* of the side exposed surface 1113 remains substantially free of attenuation coating 1400. The attenuation coating 1400 may be applied partially to the upper edge portion 1303*a* of the body 1300 such that the first portion 1113*a* of the side exposed surface 1113 is formed by the upper edge portion 1303*a* of the body 1300.

The second height $H_2$ of the second portion 1113*b* of the side exposed surface 1113 may be greater than the fourth height $H_4$ of the lower edge portion 1303*b* of the body side surface 1303 of the body 130. A ratio of the second height $H_2$ of the second portion 1113*b* of the side exposed surface 1113 to the fourth height $H_4$ of the lower edge portion 1303*b* of the body side surface 1303 of the body 130 may range from about 1:1 to about 4:1—including all ratios and sub-ranges therein.

The third height $H_3$ of the upper edge portion 1303*a* of the body side surface 1303 of the body 130 may be greater than the first height $H_1$ of the first portion 1113*a* of the side exposed surface 1113. A ratio of the third height $H_3$ of the upper edge portion 1303*a* of the body side surface 1303 to the first height $H_1$ of the first portion 1113*a* of the side exposed surface 1113 may range from about 1:1 to about 10:1—including all ratios and sub-ranges therein.

The attenuation coating 1400—in the dry state—i.e., a solid's content of about 100 wt. %—may be present on the body side surface 1303 in an amount ranging from about 30 g/m$^2$ to about 170 g/m$^2$—including all amounts and sub-ranges there-between.

The attenuation coating 1400 may be applied as an attenuation coating composition in a wet-state—i.e., with the addition of a liquid carrier as a face coating composition. The attenuation coating composition may comprise a solid's content of about 60 wt. % to about 85 wt. % —including all sub-ranges and percentages there-between. In some embodiments, the attenuation coating composition may comprise a solid's content of about 75 wt. %.

s discovered herein, the attenuation coating 1400 applied such that the second portion 1113*b* of the side exposed surface 1113 of the building panel 1110 comprises the attenuation coating 1400 while the first portion 1113*a* of the side exposed surface 1113 of the building panel 1100 is substantially free of the attenuation coating 140 allows for a fine-tuning of sound attenuation properties of the building panel 1100 and resulting building system 1 without substantial sacrifice to airflow properties necessary for sound reducing characteristics of such panels 1100 and related ceiling systems 1. Specifically, by controlling the attenuation coating 1400 present on the side exposed surface 1113, whereby the side exposed surface comprises a bevel 1109, the attenuation coating 1400 of the present invention provides a dynamic approach to better controlling CAC performance of a building panel 1100 while also properly counter balancing NRC performance by not completely sacrificing airflow characteristics of the building panel 1100 between the active room environment 2 and the plenary space 3 for installed building systems 1.

Figure 8:
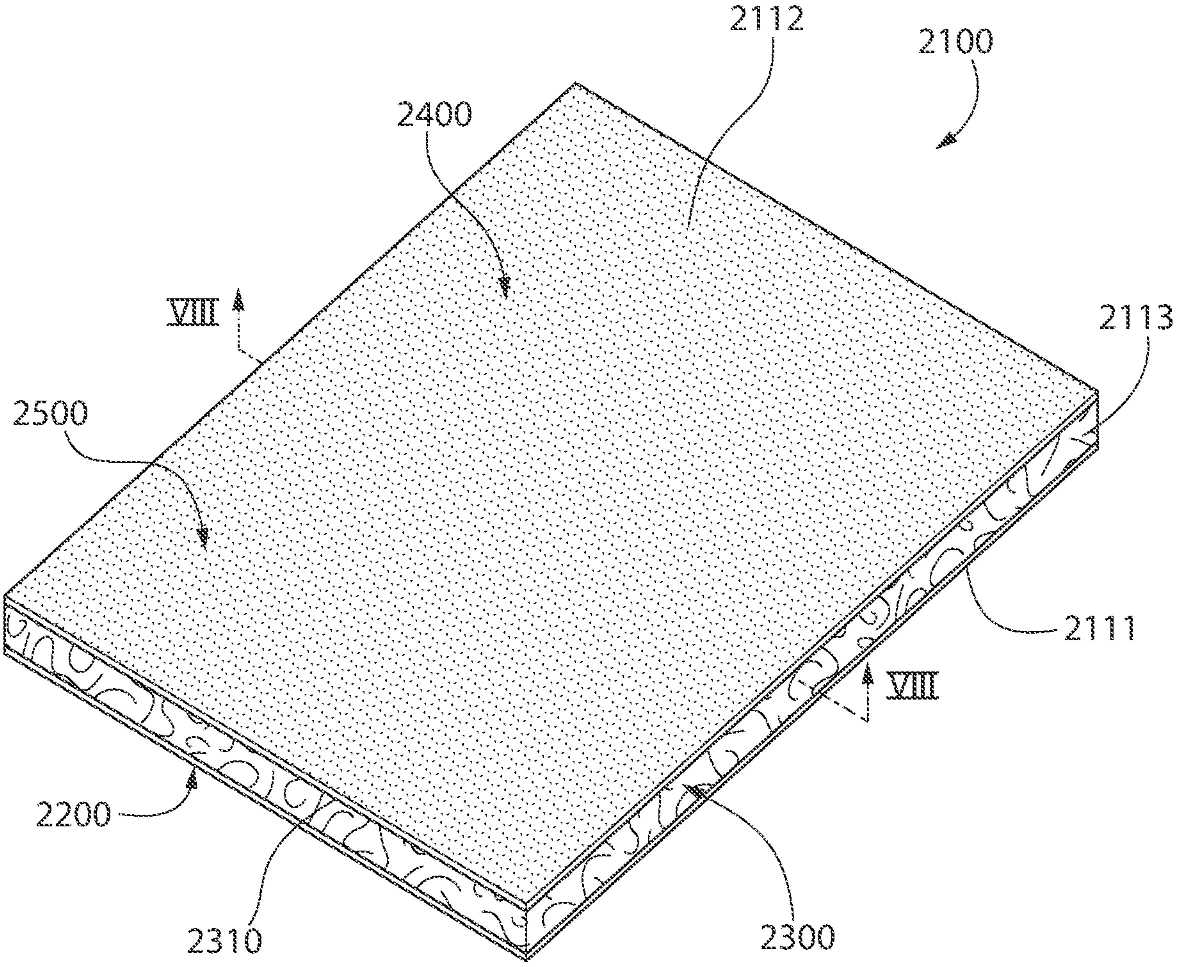
FIG. 8 is a perspective view of an acoustic building panel according to another embodiment of the present invention.
Figure 9:
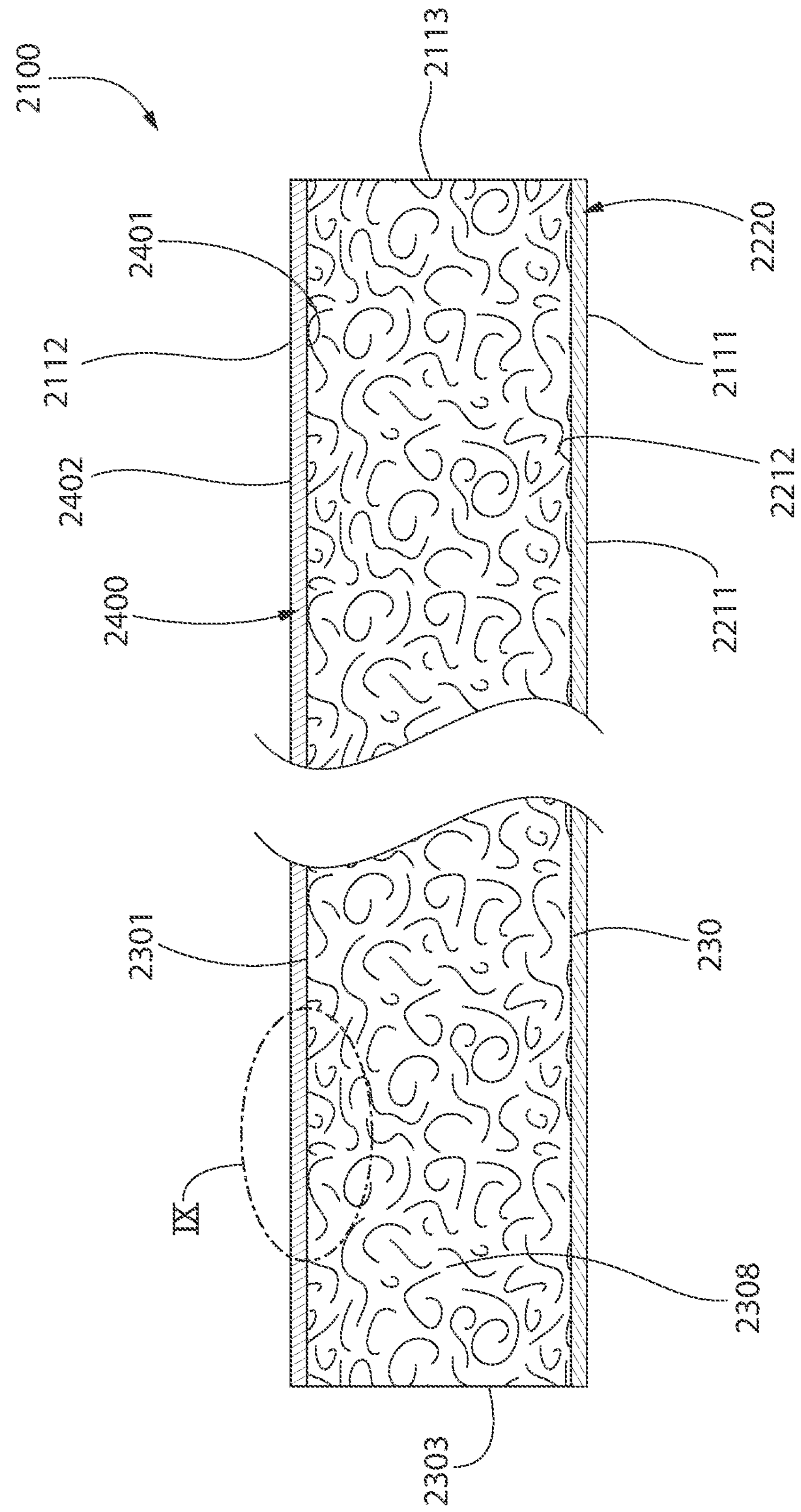
FIG. 9 is a cross-sectional view of the acoustic building panel of FIG. 8 along line VIII-VIII.
Figure 10:
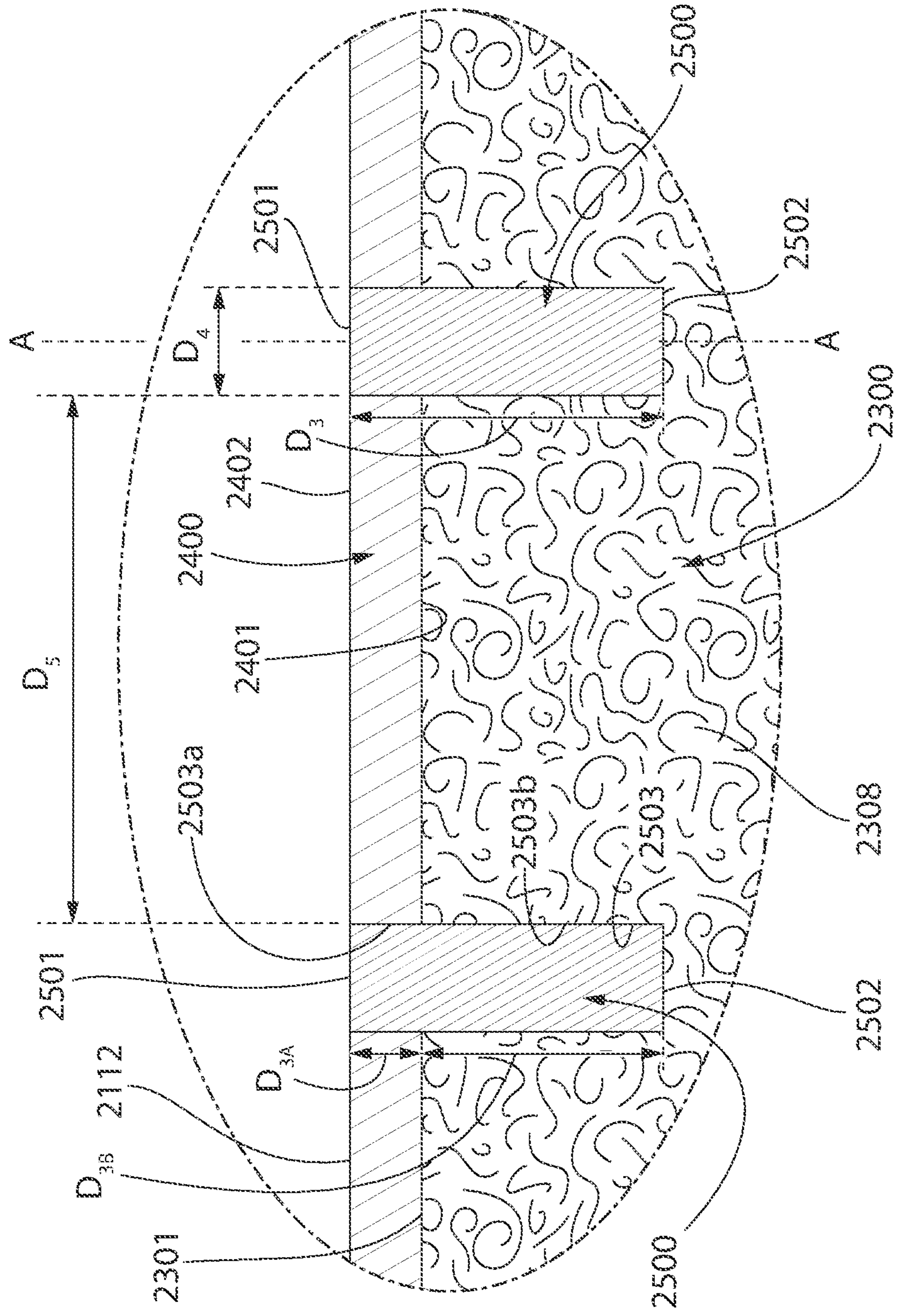
FIG. 10 is a close up view of region IX of FIG. 9 according to one embodiment.

Referring now to FIGS. 8-10, a building panel 2100 is illustrated in accordance with another embodiment of the present invention. The building panel 2100 is similar to the building panel 100 and the building panel 1100 except as described herein below. The description of the building panel 100 and the building panel 1100 above generally applies to the building panel 2100 described below except with regard to the differences specifically noted below. A similar numbering scheme will be used for the building panel 2100 as with the building panel 100 and the building panel 1100 except that the 2000-series of numbers will be used.

The acoustic building panel 2100 comprises an attenuation coating 2400 applied to the body 2300. The attenuation coating 2400 may be applied to the first major surface 2301 of the body 2300—as discussed in greater detail herein. In some embodiments, the acoustic building panel 2100 may further comprise a face coating 2200 applied to the second major surface 2302 of the body 2300.

Although not shown, the building panel 2100 of the present invention may further comprise a non-woven scrim. The non-woven scrim may comprise an upper surface opposite a lower surface. The lower surface of the non-woven scrim may be positioned immediately adjacent to and in direct contact with the second major surface 2302 of the body 2300. The face coating 2200 may be applied to the non-woven scrim such that the upper surface 2212 of the face coating 2200 is in direct contact with the upper surface of the non-woven scrim.

The attenuation coating 2400—in the dry-state—may be atop the first major surface 2301 of the body 2300 in an amount ranging from about 20 g/m$^2$ to about 36 g/m$^2$—including all amounts and sub-ranges there-between. In some embodiments, the attenuation coating 2400 may be atop the first major surface 2301 of the body 2300 in an amount ranging from about 25 g/m$^2$ to about 30 g/m$^2$—including all amounts and sub-ranges there-between.

The attenuation coating 2400 may comprise an upper surface 2402 opposite a lower surface 2401. The lower surface 2401 of the attenuation coating 2400 may face the first major surface 2301 of the body 2300. The second major exposed surface 2112 of the building panel 2100 may comprise the upper surface 2402 of the attenuation coating 2400.

The second major exposed surface 2112 of the building panel 2100 may comprise the attenuation coating 2400 and a plurality of apertures 2500. Each of the apertures 2500 may be an open pathway extending from the second major exposed surface 2112 of the building panel 2100 through the attenuation coating 2400 to the body 2300. In some embodiments, each of the apertures 2500 may be an open pathway extending continuously from the second major exposed surface 2112 of the building panel 2100 through the attenuation coating 2400 to the body 2300.

In some embodiments, each of the apertures 2500 may be an open pathway extending from the second major exposed surface 2112 of the building panel 2100 from the upper surface 2402 of the attenuation coating 2400 through the lower surface 2401 of the attenuation coating 2400 to the body 2300. In some embodiments, each of the apertures 2500 may be an open pathway extending continuously from the second major exposed surface 2112 of the building panel 2100 from the upper surface 2402 of the attenuation coating 2400 through the lower surface 2401 of the attenuation coating 2400 to the body 2300.

In some embodiments, each of the apertures 2500 may be an open pathway extending from the second major exposed surface 2112 of the building panel 2100 from the upper surface 2402 of the attenuation coating 2400 through the lower surface 2401 of the attenuation coating 2400 and through the first major surface 2301 of the body 2300. In some embodiments, each of the apertures 2500 may be an open pathway extending continuously from the second major exposed surface 2112 of the building panel 2100 from the upper surface 2402 of the attenuation coating 2400 through the lower surface 2401 of the attenuation coating 2400 and through the first major surface 2301 of the body 2300.

Each of the plurality of apertures 2500 may comprise a first end 2501 opposite a second end 2502 and an aperture wall 2503 extending between the first end 2501 and the second end 2502. The aperture wall 2503 may extend continuously between the first end 2501 and the second end 2502 of each aperture 2500, thereby defining a hollow channel that allows for the open pathway extending between the first end 2501 and the second end 2502 of each of the plurality of apertures 2500.

Each of the plurality of apertures 2500 may comprise a central axis A-A that extends between the first end 2501 and the second end 2502. According to some embodiments, the central axis A-A may be substantially parallel to the aperture 2503.

The aperture wall 2503 may extend vertically in a direction that is substantially orthogonal to the second major exposed surface 2112 of the building panel 2100. The aperture wall 2503 may extend vertically in a direction that is substantially orthogonal to the first major surface 2301 of the body 2300. The second end 2502 of each of the plurality of apertures 2500 may form a floor, whereby the floor is substantially parallel to the second major exposed surface 2112 of the building panel 2100. The second end 2502 of each of the plurality of apertures 2500 may form a floor, whereby the floor is substantially parallel to the first major surface 2301 of the body 2300.

Each of the plurality of apertures 2500 may have an aperture depth $D_3$ as measured by the distance spanning between the first end 2501 and the second end 2502. The aperture depth $D_3$ may range from about 0.0625 inches to about 0.25 inches—including all depths and sub-ranges there-between. In some embodiments, the aperture depth $D_3$ may range from about 0.0625 inches to about 0.188 inches—including all depths and sub-ranges there-between. In some embodiments, the aperture depth $D_3$ may be about 0.125 inches.

Each of the plurality of apertures 2500 may have an aperture diameter $D_4$ as measured by the distance between opposite sides of the aperture wall 2503. The aperture diameter $D_4$ may range from about 0.02 inches to about 0.375 inches—including all depths and sub-ranges there-between. In some embodiments, the aperture diameter $D_4$ may range from about 0.03 inches to about 0.03 inches—including all diameters and sub-ranges there-between. In some embodiments, the aperture diameter $D_4$ may be about 0.375 inches.

A ratio of the aperture depth $D_3$ to the aperture diameter $D_4$ may range from about 1:6 to about 8:1—including all ratios and sub-ranges there-between.

In some embodiments, the aperture depth $D_3$ may be larger than the aperture diameter $D_4$. A ratio of the aperture depth $D_3$ to the aperture diameter $D_4$ may range from about 1.5:1 to about 8:1—including all ratios and sub-ranges there-between. In some embodiments, the ratio of the aperture depth $D_3$ to the aperture diameter $D_4$ may range from about 2:1 to about 6:1—including all ratios and sub-ranges there-between. In some embodiments, the ratio of the aperture depth $D_3$ to the aperture diameter $D_4$ may range from about 3:1 to about 5:1—including all ratios and sub-ranges there-between. In some embodiments, the ratio of the aperture depth $D_3$ to the aperture diameter $D_4$ may be about 4:1.

In some embodiments, the aperture depth $D_3$ may be smaller than the aperture diameter $D_4$. A ratio of the aperture depth $D_3$ to the aperture diameter $D_4$ may range from about 1:6 to about 1:1.1—including all ratios and sub-ranges there-between. In some embodiments, the ratio of the aperture depth $D_3$ to the aperture diameter $D_4$ may range from about 1:4 to about 1:1.1—including all ratios and sub-ranges there-between. In some embodiments, the ratio of the aperture depth $D_3$ to the aperture diameter $D_4$ may range from about 1:4 to about 1:2—including all ratios and sub-ranges there-between.

The aperture wall 2503 may comprise a first portion **2503*a* and a second portion 2503*b*. The first portion 2503*a* may extend from the first end 2501 of each of the plurality of apertures 2500 to the second portion 2503*b*. The second portion 2503*b* may extend from the first portion 2503*a* to the second end 2502 of each of the plurality of apertures 2500**.

The first portion **2503*a* of the aperture wall 2503 may extend vertically in a direction that is substantially orthogonal to the second major exposed surface 2112 of the building panel 2100. The second portion 2503*b* of the aperture wall 2503 may extend vertically in a direction that is substantially orthogonal to the second major exposed surface 2112 of the building panel 2100. The first portion 2503*a* of the aperture wall 2503 may extend vertically in a direction that is substantially orthogonal to the first major surface 2301 of the body 2300. The second portion 2503*b* of the aperture wall 2503 may extend vertically in a direction that is substantially orthogonal to the first major surface 2301 of the body 2300. The first portion 2503*a* of the aperture wall 2503 may extend vertically in a direction that is substantially parallel to the central axis A-A, and the second portion 2503*b* of the aperture wall 2503** may extend vertically in a direction that is substantially parallel to the central axis A-A.

The first portion **2503*a* of the aperture wall 2503 may extend a first aperture depth $D_{3A}$. The second portion 2503*b* of the aperture wall 2503** may extend a second aperture depth $D_{3B}$. The summation of the first aperture depth $D_{3A}$ and the second aperture depth $D_{3B}$ may be substantially equal to the aperture depth $D_3$. The first aperture depth $D_{3A}$ may be equal to about 20% to about 80% of the aperture depth $D_3$—including all percentages and sub-ranges there-between. The second aperture depth $D_{3B}$ may be equal to about 30% to about 70% of the aperture depth $D_3$—including all percentages and sub-ranges there-between.

The first portion **2503*a* of the aperture wall 2503 may be formed by the attenuation coating 2400. The second portion 2503*b* of the aperture wall 2503 may be formed by the body 2300**.

Each of the plurality of apertures 2500 may be an open pathway extending from the first end 2501 located at the second major exposed surface 2112 of the building panel 2100 to the second 2502 located inside of the body 2300. In such embodiments, the open pathway may be defined by an aperture wall 2503 that includes a first portion **2503*a* formed by the attenuation coating 2400 and extending the first aperture depth $D_{3A}$ that is substantially equal to the thickness of the attenuation coating 2400 as measured between the upper surface 2402 and the lower surface 2401 of the attenuation coating 2400. In such embodiments, the open pathway may continue from the first portion 2503*b* of the aperture wall 2503 along the second portion 2503*b* of the aperture wall 2503 that extends to the second aperture depth $D_{3B}$, which may be the total depth the aperture 2500 extends from the first major surface 2301 of the body 2300 into the core 2308 of the body 2300**.

The second major exposed surface 2112 of the building may comprise the upper surface 2402 of the attenuation coating 2400 and the first end 2501 of each of the plurality of apertures 2500.

When viewing second major exposed surface 2112 of the building panel 2000 in a direction extending from the second major exposed surface 2112 to the first major exposed surface 2111, the upper surface 2402 of the attenuation coating 2400 may be visible as well as a portion of the core 2308 of the body 2300 that is located at least one of the second portion 2503*b* of the aperture wall 2503 and/or the second end 2502 of each of the plurality of apertures 2500 via the open pathway of each aperture 2500.

The second major exposed surface 2112 of the building panel 2100 may have an overall surface area as defined by the perimeter 2310 of the body 2300, the attenuation coating 2400 may occupy a first surface area, and the first end 2501 of each of the plurality of apertures 2400 may occupy a second surface area, wherein the summation of the first surface area and the second surface area is substantially equal to the overall surface area of the second major exposed surface 2112 of the building panel 2100.

Each of the plurality of apertures 2500 may be offset by an aperture separation distance $D_5$—as measured by the distance spanning between adjacent most apertures 2500 without an intervening aperture 2500. The aperture separation distance $D_5$ may range from about 0.125 inches to about 2.0 inches—including all distances and sub-ranges there-between. In some embodiments, the aperture separation distance $D_5$ may range from about 0.25 inches to about 0.75 inches—including all distances and sub-ranges there-between. In some embodiments, the aperture separation distance $D_5$ may be about 0.25 inches. In some embodiments, the aperture separation distance $D_5$ may be about 0.375 inches. In some embodiments, the aperture separation distance $D_5$ may be about 0.5 inches. In some embodiments, the aperture separation distance $D_5$ may be about 0.625 inches. In some embodiments, the aperture separation distance $D_5$ may be about 0.75 inches.

The plurality of apertures 2500 may be present on the building panel 2100 in an aperture density ranging from about 20 aperture/ft$^2$ to about 9100 aperture/ft$^2$—including all densities and sub-ranges there-between. In some embodiments, the plurality of apertures 2500 may be present on the building panel 2100 in an aperture density ranging from about 20 aperture/ft$^2$ to about 600 aperture/ft$^2$—including all densities and sub-ranges there-between. In some embodiments, the plurality of apertures 2500 may be present on the building panel 2100 in an aperture density ranging from about 30 aperture/ft$^2$ to about 350 aperture/ft$^2$—including all densities and sub-ranges there-between. In some embodiments, the plurality of apertures 2500 may be present on the building panel 2100 in an aperture density ranging from about 200 aperture/ft$^2$ to about 600 aperture/ft$^2$—including all densities and sub-ranges there-between.

In some embodiments, the plurality of apertures 2500 may be present on the building panel 2100 in an aperture density of about 37 aperture/ft$^2$. In some embodiments, the plurality of apertures 2500 may be present on the building panel 2100 in an aperture density of about 57 aperture/ft$^2$. In some embodiments, the plurality of apertures 2500 may be present on the building panel 2100 in an aperture density of about 48 aperture/ft$^2$. In some embodiments, the plurality of apertures 2500 may be present on the building panel 2100 in an aperture density of about 89 aperture/ft$^2$. In some embodiments, the plurality of apertures 2500 may be present on the building panel 2100 in an aperture density of about 350 aperture/ft$^2$.

In some embodiments, the aperture diameter $D_4$ may range from about 0.03 inches to about 0.063 inches, the aperture separation distance $D_5$ may range from about 0.1 inches to about 0.15 inches, and having an aperture density ranging from about 8,900 aperture/ft$^2$ to about 9,100 aperture/ft$^2$.

In some embodiments, the aperture diameter $D_4$ may range from about 0.03 inches to about 0.063 inches, the aperture separation distance $D_5$ may range from about 0.4 inches to about 0.6 inches, and having an aperture density ranging from about 400 aperture/ft$^2$ to about 600 aperture/ft$^2$.

In some embodiments, the aperture diameter $D_4$ may range from about 0.03 inches to about 0.063 inches, the aperture separation distance $D_5$ may range from about 0.9 inches to about 1.1 inches, and having an aperture density ranging from about 100 aperture/ft$^2$ to about 140 aperture/ft$^2$.

In some embodiments, the aperture diameter $D_4$ may range from about 0.03 inches to about 0.063 inches, the aperture separation distance $D_5$ may range from about 1.9 inches to about 2.1 inches, and having an aperture density ranging from about 20 aperture/ft$^2$ to about 30 aperture/ft$^2$.

In some embodiments, the aperture diameter $D_4$ may range from about 0.05 inches to about 0.08 inches, the aperture separation distance $D_5$ may range from about 0.1 inches to about 0.15 inches, and having an aperture density ranging from about 8,900 aperture/ft$^2$ to about 9,100 aperture/ft$^2$.

In some embodiments, the aperture diameter $D_4$ may range from about 0.05 inches to about 0.08 inches, the aperture separation distance $D_5$ may range from about 0.4 inches to about 0.6 inches, and having an aperture density ranging from about 400 aperture/ft$^2$ to about 600 aperture/ft$^2$.

In some embodiments, the aperture diameter $D_4$ may range from about 0.05 inches to about 0.08 inches, the aperture separation distance $D_5$ may range from about 0.9 inches to about 1.1 inches, and having an aperture density ranging from about 100 aperture/ft$^2$ to about 140 aperture/ft$^2$.

In some embodiments, the aperture diameter $D_4$ may range from about 0.05 inches to about 0.08 inches, the aperture separation distance $D_5$ may range from about 1.9 inches to about 2.1 inches, and having an aperture density ranging from about 20 aperture/ft$^2$ to about 30 aperture/ft$^2$.

In some embodiments, the aperture diameter $D_4$ may range from about 0.1 inches to about 0.15 inches, the aperture separation distance $D_5$ may range from about 0.4 inches to about 0.6 inches, and having an aperture density ranging from about 400 aperture/ft$^2$ to about 600 aperture/ft$^2$.

In some embodiments, the aperture diameter $D_4$ may range from about 0.1 inches to about 0.15 inches, the aperture separation distance $D_5$ may range from about 0.9 inches to about 1.1 inches, and having an aperture density ranging from about 100 aperture/ft$^2$ to about 140 aperture/ft$^2$.

In some embodiments, the aperture diameter $D_4$ may range from about 0.1 inches to about 0.15 inches, the aperture separation distance $D_5$ may range from about 1.9 inches to about 2.1 inches, and having an aperture density ranging from about 20 aperture/ft$^2$ to about 30 aperture/ft$^2$.

In some embodiments, the aperture diameter $D_4$ may range from about 0.3 inches to about 0.4 inches, the aperture separation distance $D_5$ may range from about 0.4 inches to about 0.6 inches, and having an aperture density ranging from about 400 aperture/ft$^2$ to about 600 aperture/ft$^2$.

In some embodiments, the aperture diameter $D_4$ may range from about 0.3 inches to about 0.4 inches, the aperture separation distance $D_5$ may range from about 0.9 inches to about 1.1 inches, and having an aperture density ranging from about 100 aperture/ft$^2$ to about 140 aperture/ft$^2$.

In some embodiments, the aperture diameter $D_4$ may range from about 0.3 inches to about 0.4 inches, the aperture separation distance $D_5$ may range from about 1.9 inches to about 2.1 inches, and having an aperture density ranging from about 20 aperture/ft$^2$ to about 30 aperture/ft$^2$.

Each of the plurality of apertures 2500 may have an open pathway with a cross-sectional shape that is circular, ovular, or polygonal. The plurality of apertures 2500 may have a substantially uniform distribution across the second major exposed surface 2112 of the building panel 2100. In other embodiments, the plurality of apertures 2500 may have a non-uniform distribution across the second major exposed surface 2112 of the building panel 2100.

Figure 11:
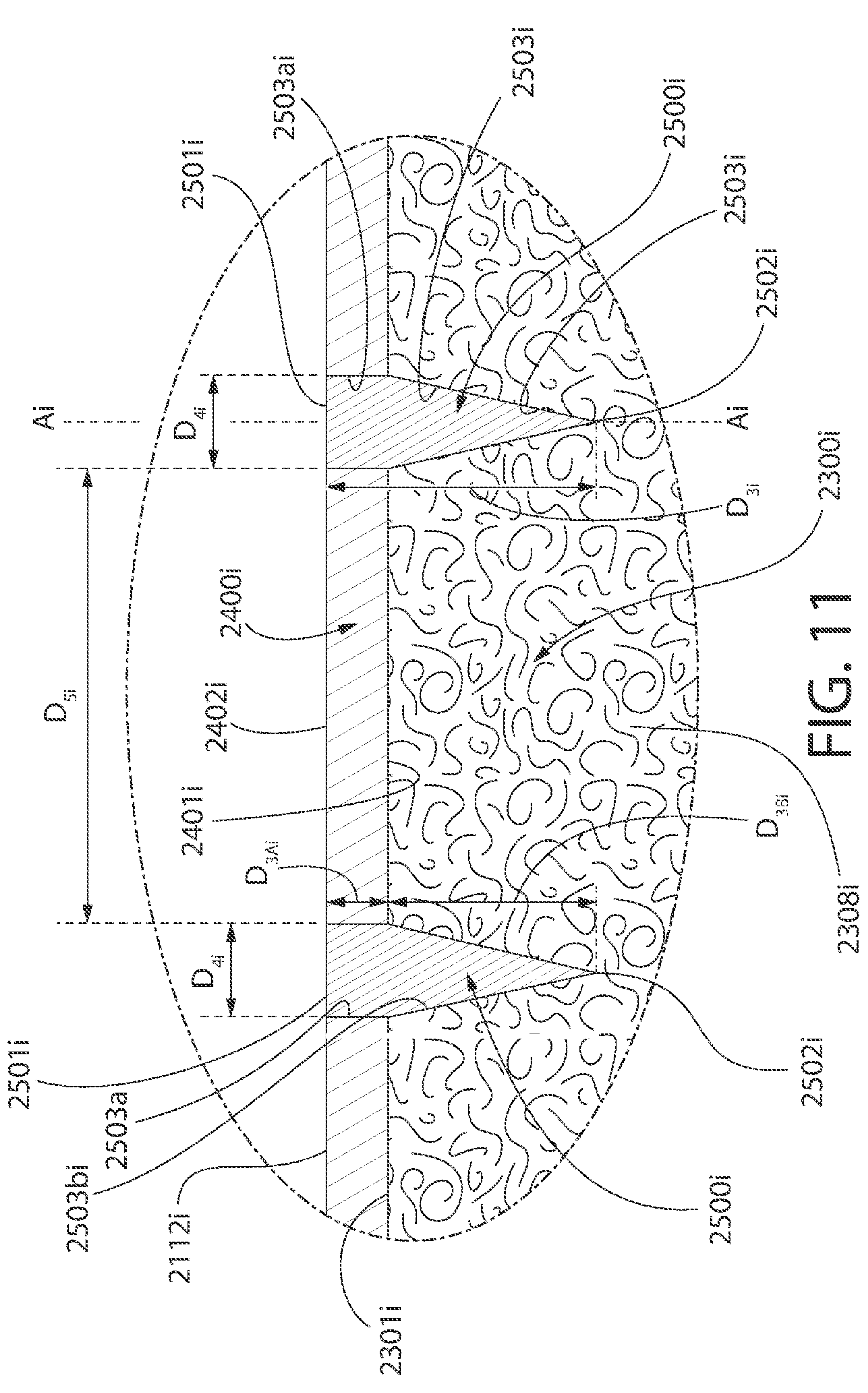
FIG. 11 is a close up view of region IX of FIG. 9 according to another embodiment.

Referring now to FIG. 11, a building panel 2100*i* is illustrated in accordance with another embodiment of the present invention. The building panel 2100*i* is similar to the building panel 2100 except as described herein below. The description of the building panel 2100 generally applies to the building panel 2100*i* described below except with regard to the differences specifically noted below. A similar numbering scheme will be used for the building panel 2100*i* as with the building panel 2100 except that the 2000i-series of numbers will be used.

The second major exposed surface 2112*i* of the building panel 2100*i* may comprise the attenuation coating 2400*i* and a plurality of apertures 2500*i*. Each of the plurality of apertures 2500*i* may comprise a first end 2501*i* opposite a second end 2502*i* and an aperture wall 2503*i* extending between the first end 2501*i* and the second end 2502*i*.

The aperture wall 2503*i* may extend continuously between the first end 2501*i* and the second end 2502 of each aperture 2500*i*, thereby defining a hollow channel that allows for the open pathway extending between the first end 2501*i* and the second end 2502*i* of each of the plurality of apertures 2500*i*.

Each of the plurality of apertures 2500 may comprise a central axis Ai-Ai that extends between the first end 2501*i* and the second end 2502*i*. The aperture wall 2503*i* may comprise a first portion 2503*ai* and a second portion 2503*bi*. The first portion 2503*ai* may extend from the first end 2501*i* of each of the plurality of apertures 2500*i* to the second portion 2503*bi*. The second portion 2503*bi* may extend from the first portion 2503*ai* to the second end 2502*i* of each of the plurality of apertures 2500*i*.

The aperture wall 2503 may extend vertically in a multi-direction. The first portion 2503*ai* of the aperture wall 2503 may extend vertically in a direction that is substantially orthogonal to the first major surface 2301 of the body 2300 and the second portion 2503*bi* of the aperture wall 2503 may extend vertically in a direction that is oblique to the first major surface 2301*i* of the body 2300*i*.

The first portion 2503*ai* of the aperture wall 2503 may extend in a direction that is substantially parallel to the central axis Ai-Ai and the second portion 2503*bi* of the aperture wall 2503 may extend vertically in a direction that is oblique to the central axis Ai-Ai.

The second portion 2503*bi* may extend inward toward the central axis Ai-Ai and terminate at the second end 2502*i*. The second portion 2503*bi* of the aperture wall 2503*i* may form an inverted conical shape. The second end 2502*i* may be an apex of the conical shape or may form a floor of an inverted truncated conical shape.

The building panel 2100 according to this embodiment may be formed by applying an attenuation coating composition—in the wet-state—to the first major surface 2301 of the body 230 and drying the attenuation coating composition to form an un-perforated attenuation coating.

The building panel 2100 according to this embodiment may be formed by applying the attenuation coating composition—in the wet-state—to the first major surface 2301 of the body 2300 in a continuous manner such that substantially the entirely of the first major surface 2301 of the body 2300 is coated with the attenuation coating composition. Stated otherwise, the attenuation coating composition—in the wet-state—may be applied in a continuous manner to the entirety of the first major surface 2301 of the body 2300 such that substantially the entirely of the first major surface 2301 of the body 2300 is coated with the attenuation coating composition.

Subsequently, the unperforated attenuation coating may be machined to form the plurality of apertures 2500 that extend from the upper surface 2402 of the aperture coating 2400 into the core 2308 of the body 2300. In a non-limiting example, the plurality of apertures 2500 may be formed by a needle-punching process—whereby the needle-punching may be operated to achieve the final aperture depth $D_3$, aperture diameter $D_4$, aperture separation distance $D_5$, and aperture density. The attenuation coating 2400 of this embodiment may be referred to as a "perforated attenuation coating" 2400 to refer to the fact that the plurality of apertures extend through the attenuation coating 2400 between the lower surface 2401 and the upper surface 2402.

As discovered herein, the addition of the plurality of apertures 2500 to the building panel 2100 allows for a fine-tuning of sound attenuation properties of the building panel 2100 and resulting building system 1 without substantial sacrifice to airflow properties necessary for sound reducing characteristics of such panels 2100 and related ceiling systems 1. Specifically, by tailoring the final aperture depth $D_3$, aperture diameter $D_4$, aperture separation distance $D_5$, and aperture density, the perforated attenuation coating 2400 of the present invention provides a dynamic approach to better controlling CAC performance of a building panel 2100 while also properly counter balancing NRC performance by not completely sacrificing airflow characteristics of the building panel 100 between the first major exposed surface 2111 and the second major exposed surface 2112.

The building panel 2100 may exhibit an airflow resistance as measured between the first major exposed surface 2111 and the second major exposed surface 2112—the airflow resistance measured by the following formula:

$$R=(P_A-P_{ATM})/V$$

Where R is air flow resistance (measured in ohms); $P_A$ is the applied air pressure; $P_{ATM}$ is atmospheric air pressure; and V is volumetric airflow. The airflow resistance of the building panel 2100 may range from about 5 ohms to about 25 ohms—including all airflow resistances and sub-ranges there-between. In some embodiments, the building panel 2000 may exhibit an airflow resistance as measured between the first major exposed surface 2111 and the second major exposed surface 2112 that ranges from about 8 ohms to about 22 ohms—including all airflow resistances and subranges there-between. In some embodiments, the building panel 2000 may exhibit an airflow resistance as measured between the first major exposed surface 2111 and the second major exposed surface 2112 that ranges from about 10 ohms to about 20 ohms—including all airflow resistance and sub-ranges there-between.

What is claimed is:

1. An acoustic building panel having a first major exposed surface opposite a second major exposed surface and a side exposed surface extending there between, the acoustic ceiling panel comprising:

a body that is air-permeable, the body comprising a first major surface opposite a second major surface and a side surface extending there between, the side surface comprising:

a lower edge portion adjacent to the first major surface; and an upper edge portion adjacent to the second major surface;

an attenuation coating applied to the first major surface, the attenuation coating applied in a plurality of discrete attenuation regions, each discrete attenuation region separated from adjacent attenuation regions by at least a portion of the body;

wherein each discrete attenuation region is separated from the side surface such that a perimeter on the first major surface is free from the attenuation coating and is defined around the plurality of discrete attenuation regions; and wherein a first portion of the side exposed surface of the acoustic building panel is formed by the upper edge portion of the side surface of the body, and a second portion of the side exposed surface of the acoustic building panel is formed by the lower edge portion.

2. The acoustic building panel according to claim 1, wherein the side exposed surface has an overall height, the first portion has a first height, and the second portion has a second height, wherein the summation of the first height and the second height is substantially equal to the overall height of the side exposed surface.

3. The acoustic building panel according to claim 2, wherein a ratio of the second height to the first height ranges from about 1:1 to about 10:1.

4. The acoustic building panel according to claim 1, wherein the side surface comprises a bevel that is adjacent to the second major surface of the body.

5. The acoustic building panel according to claim 4, wherein the bevel overlaps with the first portion of the side exposed surface of the acoustic building panel and the second portion of the side exposed surface of the acoustic building panel.

6. The acoustic building panel according to claim 5, wherein the bevel fully overlaps with the first portion of the side exposed surface of the acoustic building panel and partially overlaps with the second portion of the side exposed surface of the acoustic building panel.

7. The acoustic building panel according to claim 1, wherein the body is formed of a fibrous material.

8. The acoustic building panel according to claim 7, wherein the fibrous material comprises an inorganic fiber selected from one or more of fiberglass, mineral wool, rock wool, and stone wool.

9. The acoustic building panel according to claim 1, wherein the body exhibits an NRC value of at least 0.7.

10. The acoustic building panel according to claim 1, wherein the attenuation coating comprises a polymer binder and a filler.

11. The acoustic building panel according to claim 2, wherein the upper edge portion of the body has a third height and the lower edge portion has a fourth height, and wherein the first height and third height are not equal and wherein the second height and the fourth height are not equal.

12. A ceiling system comprising:

a ceiling grid comprising a plurality of first members and a plurality of second members, the first and second members intersecting one another to define a plurality of grid openings;

a plenary space above the ceiling grid;

a room environment below the ceiling grid; and the acoustical building panel according to claim 1 mounted to the ceiling grid and positioned within the grid opening;

wherein the second major exposed surface of the acoustical building panel faces the plenary space.

13. The ceiling system according to claim 12, wherein the side exposed surface of the acoustic building panel at least partially overlaps with the ceiling grid in a horizontal direction.

* * * * *